United States Patent
Sangle et al.

(10) Patent No.: US 12,236,122 B2
(45) Date of Patent: *Feb. 25, 2025

(54) DYNAMIC VOLUME ADJUSTMENT

(71) Applicant: Pure Storage, Inc., Santa Clara, CA (US)

(72) Inventors: Ganesh Sangle, Sunnyvale, CA (US); Vinod Jayaraman, San Francisco, CA (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/216,421

(22) Filed: Jun. 29, 2023

(65) Prior Publication Data

US 2023/0342057 A1 Oct. 26, 2023

Related U.S. Application Data

(63) Continuation of application No. 17/185,779, filed on Feb. 25, 2021, now Pat. No. 11,733,897.

(51) Int. Cl.
*G06F 3/00* (2006.01)
*G06F 3/06* (2006.01)
(52) U.S. Cl.
CPC .......... *G06F 3/0644* (2013.01); *G06F 3/0604* (2013.01); *G06F 3/0665* (2013.01); *G06F 3/067* (2013.01)
(58) Field of Classification Search
CPC .... G06F 3/0644; G06F 3/0604; G06F 3/0665; G06F 3/067
See application file for complete search history.

(56) References Cited

U.S. PATENT DOCUMENTS

| | | |
|---|---|---|
| 6,718,427 B1 | 4/2004 | Carlson |
| 6,816,941 B1 | 11/2004 | Carlson |
| 7,089,395 B2 | 8/2006 | Jacobson |
| 7,412,583 B2 | 8/2008 | Burton |
| 7,434,017 B2 | 10/2008 | Maruyama |
| 7,613,878 B2 | 11/2009 | Mori |
| 7,617,371 B2 | 11/2009 | Fujimoto |
| 7,734,888 B1 | 6/2010 | Hamilton |
| 7,809,917 B2 | 10/2010 | Burton |

(Continued)

OTHER PUBLICATIONS

Hwang, et al., "RAID-x: A New Distributed Disk Array for I/O-Centric Cluster Computing", Proceedings the Ninth International Symposium on High-Performance Distributed Computing, 2000, pp. 279-286.

(Continued)

*Primary Examiner* — Craig S Goldschmidt
(74) *Attorney, Agent, or Firm* — ALG Intellectual Property, LLC

(57) ABSTRACT

A virtual storage volume may be implemented as one or more chunks stored on a set of storage nodes. The virtual storage volume may be dynamically adjusted by adjusting the one or more chunks that make up the virtual storage volume, without taking the virtual storage volume offline. Such dynamic volume adjustment may allow for increasing volume size without moving data unnecessarily. In addition or alternatively, such dynamic volume adjustment may free up storage space in a node with minimum movement of data.

20 Claims, 15 Drawing Sheets

(56) References Cited

U.S. PATENT DOCUMENTS

| | | |
|---|---|---|
| 7,873,809 B2 | 1/2011 | Kano |
| 7,945,748 B2 | 5/2011 | Shibayama |
| 7,975,115 B2 | 7/2011 | Wayda et al. |
| 8,055,723 B2 | 11/2011 | Acedo |
| 8,086,808 B2 | 12/2011 | Ichikawa |
| 8,225,057 B1 | 7/2012 | Zheng |
| 8,230,069 B2 | 7/2012 | Korupolu |
| 8,250,327 B2 | 8/2012 | Fuji |
| 8,291,159 B2 | 10/2012 | Rajagopal |
| 8,489,845 B2 | 7/2013 | Ozaki |
| 8,495,331 B2 | 7/2013 | Matsumoto |
| 8,495,472 B1 | 7/2013 | Magerramov et al. |
| 8,504,797 B2 | 8/2013 | Mimatsu |
| 8,516,215 B2 | 8/2013 | Satoyama |
| 8,539,194 B2 | 9/2013 | Inoue |
| 8,612,679 B2 | 12/2013 | Schnapp |
| 8,612,776 B2 | 12/2013 | Hakamata |
| 8,706,914 B2 | 4/2014 | Duchesneau |
| 8,745,354 B2 | 6/2014 | Mori |
| 8,769,235 B2 | 7/2014 | Satoyama |
| 8,775,730 B2 | 7/2014 | Inoue |
| 8,822,155 B2 | 9/2014 | Sukumar et al. |
| 8,862,833 B2 | 10/2014 | Noll |
| 8,863,139 B2 | 10/2014 | Kakeda |
| 8,880,810 B2 | 11/2014 | Yamamoto |
| 8,918,478 B2 | 12/2014 | Ozzie et al. |
| 9,182,926 B2 | 11/2015 | Naganuma |
| 9,201,607 B2 | 12/2015 | Satoyama |
| 9,229,860 B2 | 1/2016 | Matsuzawa |
| 9,237,131 B2 | 1/2016 | Nahum |
| 9,275,063 B1 | 3/2016 | Natanzon |
| 9,280,678 B2 | 3/2016 | Redberg |
| 9,294,236 B1 | 3/2016 | Ward |
| 9,395,922 B2 | 7/2016 | Nishikido et al. |
| 9,535,629 B1 | 1/2017 | Desimone et al. |
| 9,552,299 B2 | 1/2017 | Stalzer |
| 9,569,245 B2 | 2/2017 | Iwamatsu |
| 9,740,403 B2 | 8/2017 | Storer et al. |
| 9,747,036 B2 | 8/2017 | Maki |
| 9,760,290 B2 | 9/2017 | Jayaraman |
| 9,760,294 B2 | 9/2017 | Miwa |
| 9,864,874 B1 | 1/2018 | Shanbhag et al. |
| 10,025,673 B1 | 7/2018 | Maccanti et al. |
| 10,102,356 B1 | 10/2018 | Sahin et al. |
| 10,185,495 B2 | 1/2019 | Katsuki |
| 10,324,639 B2 | 6/2019 | Seo |
| 10,365,980 B1 | 7/2019 | Bromling |
| 10,452,293 B2 | 10/2019 | Yamamoto |
| 10,503,441 B2 | 12/2019 | Israni et al. |
| 10,564,870 B1 | 2/2020 | Greenwood |
| 10,567,406 B2 | 2/2020 | Astigarraga et al. |
| 10,594,571 B2 | 3/2020 | Dippenaar |
| 10,628,088 B2 | 4/2020 | Matsushita |
| 10,628,200 B2 | 4/2020 | Hadas |
| 10,664,182 B2 | 5/2020 | Oohira |
| 10,810,088 B1 | 10/2020 | Gu et al. |
| 10,846,137 B2 | 11/2020 | Vallala et al. |
| 10,877,683 B2 | 12/2020 | Wu et al. |
| 10,949,125 B2 | 3/2021 | Liguori |
| 10,956,063 B2 | 3/2021 | Yamamoto |
| 11,106,810 B2 | 8/2021 | Natanzon et al. |
| 2002/0103889 A1 | 8/2002 | Markson |
| 2004/0068611 A1 | 4/2004 | Jacobson |
| 2006/0107016 A1 | 5/2006 | Murotani |
| 2006/0107017 A1 | 5/2006 | Serizawa |
| 2006/0282641 A1 | 12/2006 | Fujimoto |
| 2007/0233987 A1 | 10/2007 | Maruyama |
| 2007/0233992 A1 | 10/2007 | Sato |
| 2008/0028143 A1 | 1/2008 | Murase |
| 2008/0222376 A1 | 9/2008 | Burton |
| 2009/0150639 A1 | 6/2009 | Ohata |
| 2009/0228589 A1 | 9/2009 | Korupolu |
| 2009/0240880 A1 | 9/2009 | Kawaguchi |
| 2009/0254636 A1 | 10/2009 | Acedo |
| 2009/0327215 A1 | 12/2009 | Zhu et al. |
| 2010/0011185 A1 | 1/2010 | Inoue |
| 2010/0017577 A1 | 1/2010 | Fujimoto |
| 2010/0082900 A1 | 4/2010 | Murayama |
| 2010/0100604 A1 | 4/2010 | Fujiwara |
| 2010/0332882 A1 | 12/2010 | Nayak |
| 2011/0035540 A1 | 2/2011 | Fitzgerald et al. |
| 2011/0060885 A1 | 3/2011 | Satoyama |
| 2011/0066823 A1 | 3/2011 | Ando |
| 2011/0161406 A1 | 6/2011 | Kakeda |
| 2011/0185135 A1 | 7/2011 | Fuji |
| 2011/0185139 A1 | 7/2011 | Inoue |
| 2011/0191537 A1 | 8/2011 | Kawaguchi |
| 2011/0252214 A1 | 10/2011 | Naganuma |
| 2011/0264868 A1 | 10/2011 | Takata |
| 2011/0276772 A1 | 11/2011 | Ohata |
| 2012/0166751 A1 | 6/2012 | Matsumoto |
| 2012/0173838 A1 | 7/2012 | Noll |
| 2012/0226885 A1 | 9/2012 | Mori |
| 2012/0311260 A1 | 12/2012 | Yamagiwa |
| 2013/0117448 A1 | 5/2013 | Nahum |
| 2014/0006726 A1 | 1/2014 | Yamamoto |
| 2014/0281339 A1 | 9/2014 | Satoyama |
| 2014/0372723 A1 | 12/2014 | Bobroff |
| 2015/0134615 A1 | 5/2015 | Goodman et al. |
| 2015/0277955 A1 | 10/2015 | Iwamatsu |
| 2015/0331793 A1 | 11/2015 | Matsuzawa |
| 2016/0004476 A1 | 1/2016 | Emaru |
| 2016/0041787 A1* | 2/2016 | Nicolae .......... G06F 3/0685 710/74 |
| 2016/0092132 A1 | 3/2016 | Hildebrand |
| 2016/0094410 A1 | 3/2016 | Anwar |
| 2016/0253114 A1 | 9/2016 | Deguchi |
| 2017/0090774 A1 | 8/2017 | Dambal |
| 2017/0220282 A1 | 8/2017 | Dambal |
| 2017/0222890 A1 | 8/2017 | Dippenaar |
| 2017/0308316 A1 | 10/2017 | Yamamoto |
| 2017/0359221 A1 | 12/2017 | Hori |
| 2018/0004447 A1 | 1/2018 | Oohira |
| 2019/0114094 A1* | 4/2019 | Ki .................. G06F 3/0665 |
| 2019/0129740 A1 | 5/2019 | Hadas |
| 2019/0266022 A1 | 8/2019 | Israni et al. |
| 2019/0272222 A1 | 9/2019 | Wei |
| 2020/0042213 A1 | 2/2020 | Yamamoto |
| 2020/0073552 A1 | 3/2020 | Sangle |
| 2020/0104151 A1 | 4/2020 | Shibayama |
| 2020/0264956 A1 | 8/2020 | Thomas |
| 2020/0409600 A1 | 12/2020 | Liguori |

OTHER PUBLICATIONS

Stalzer, "FlashBlades: System Architecture and Applications", Proceedings of the 2nd Workshop on Architectures and Systems for Big Data, Association for Computing Machinery, New York, NY, 2012, pp. 10-14.

Storer, et al., "Pergamum: Replacing Tape with Energy Efficient, Reliable, Disc-Based Archival Storage", FAST'08: Proceedings of the 6th USENIX Conference on File and Storage Technologies, Feb. 2008, Article No. 1, pp. 1-16.

* cited by examiner

DYNAMIC VOLUME ADJUSTMENT

RELATED APPLICATIONS

This application is a continuation application of U.S. patent application Ser. No. 17/185,779, filed Feb. 25, 2021, which is hereby incorporated by reference in its entirety.

TECHNICAL FIELD

The present disclosure relates generally to containerized applications and more specifically to containerized scalable storage applications.

DESCRIPTION OF RELATED ART

When deploying applications in the cloud, both the hardware and software of the underlying computing device may vary considerably between different environments and different machines. Accordingly, one of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. One example of a containerized software application is a containerized software-assisted storage environment.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Various embodiments of the present disclosure relate generally to methods, systems, device, and computer readable media associated with dynamic volume storage adjustment. According to various embodiments a virtual storage volume is stored across a storage node cluster. The storage node cluster includes a plurality of storage nodes. Each storage node includes one or more storage pools for storing data corresponding to the virtual storage volume. Each storage pool corresponds to one or more storage devices having storage space allocated for storing the data. The virtual storage volume comprises one or more chunks stored on a set of storage nodes in the plurality of storage nodes. Then, volume storage across the set of storage nodes is adjusted by determining 1) whether to increase the amount of storage space allocated for the virtual storage volume and 2) whether data needs to be moved from a first pool. If the amount of storage space allocated needs to be increased, then the amount of storage space allocated is increased by adding a new chunk to the virtual storage volume without moving data. The new size of the increased virtual storage volume is a multiple of the size of the new chunk. If data needs to be moved from the first pool, storage space in the set of storage nodes is freed up by reducing the size of each chunk, adding one or more new chunks with the reduced chunk size, and moving only a portion of the data from the first pool to a second pool corresponding to the one or more new chunks.

In some embodiments, the virtual storage volume is striped across the one or more storage pools. In some embodiments, chunk sizes can be changed on the fly. In some embodiments, determining whether data needs to be moved includes determining whether data storage for the first pool is over a predetermined threshold for data storage. In some embodiments, determining whether to increase the amount of storage space allocated for the virtual storage volume includes receiving a request to increase the size of the virtual storage volume. In some embodiments, reducing the size of each chunk includes reducing the size of each chunk by the same amount. In some embodiments, any offset can be mapped in $O(1)$.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
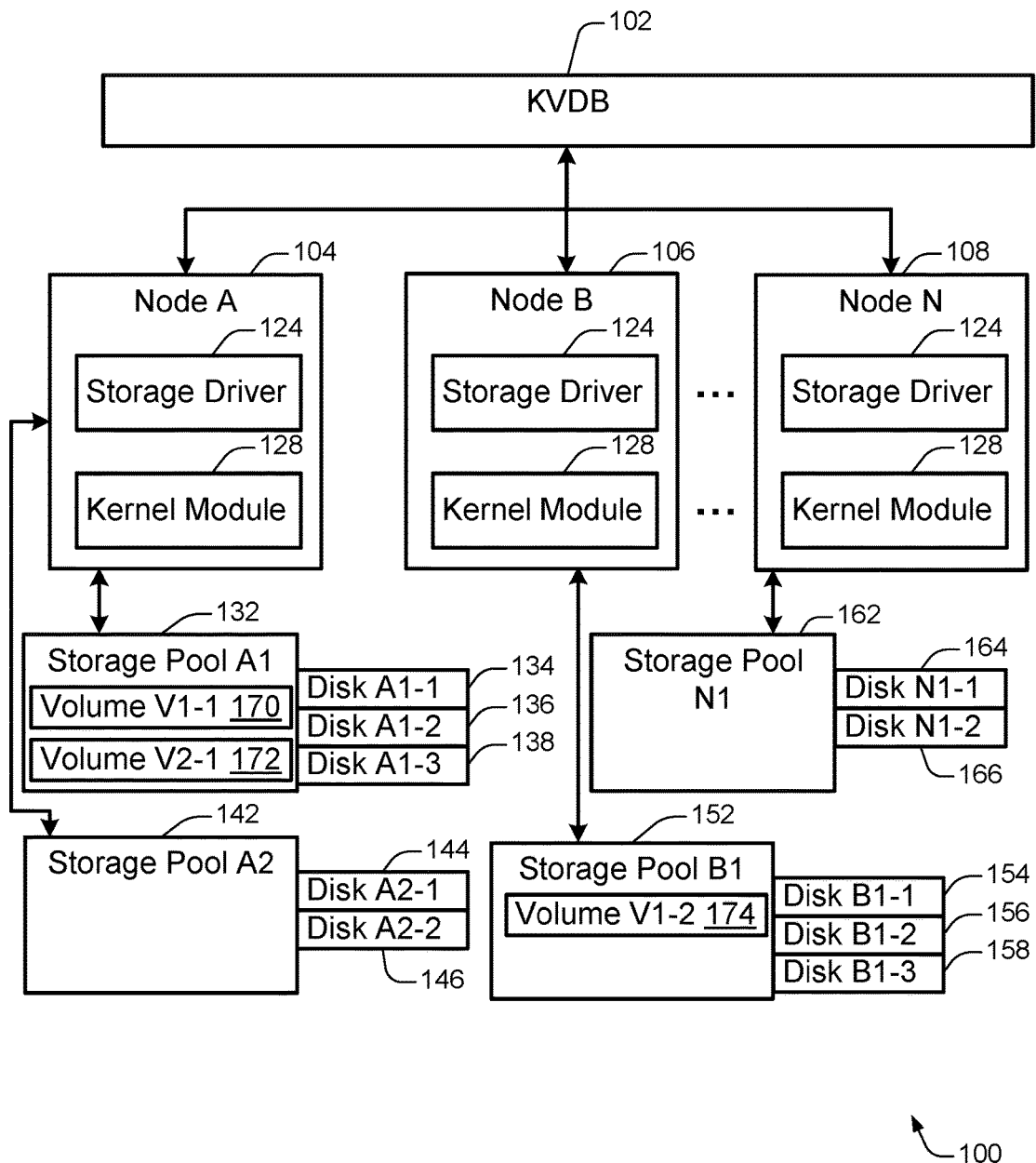
FIG. 1 illustrates an example of an arrangement of components in a distributed storage system, configured in accordance with one or more embodiments.

Reference will now be made in detail to some specific examples of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the techniques of the present disclosure will be described in the context of particular containerized storage environments. However, it should be noted that the techniques of the present disclosure apply to a wide variety of different containerized storage environments. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Example Embodiments

According to various embodiments, a virtual storage volume may provide storage for one or more applications. A virtual storage volume can span one or more different physical disks and can be made accessible to potentially many different compute nodes. However, a virtual storage volume will often be mounted on a specific compute node for the purpose of avoiding conflicts and race conditions in writing data to the storage volume.

In some configurations, a virtual storage volume may be replicated in the sense that more than one copy of the data is maintained. When a virtual storage volume is replicated, an instruction to write data to the virtual storage volume is split and then applied to each of the replicas. The replication factor of a virtual storage volume identifies the number of replicas being maintained.

In some implementations, maintaining two or more replicas of a virtual storage volume can provide any of a variety of advantages. For example, requests to read data from the virtual storage volume can be divided among the different replicas, potentially reducing input/output (I/O) latency and/or I/O loads for individual nodes.

In some configurations, it may be necessary or desired to increase the size of a virtual storage volume. For example, as an application size grows, then the amount of data to be stored grows as well. This can happen in applications like database applications. In such examples, the volume size needs to be increased. In another example, for instance in thin-provisioned systems, an initial size of a virtual volume is usually insufficient as more data becomes stored on the virtual volume. In addition, in some configurations, it may be necessary or desired to move data from one storage pool to another, if a pool or node becomes full.

However, conventional approaches to increasing the size of a virtual storage volume or moving data from a full pool to an empty one impose considerable "unnecessary" data movement, which can be wasteful and inefficient. For example, under a conventional approach, increasing the size of a virtual storage volume may involve copying the entire volume data in a first pool and then subsequently transferring the data to a larger pool. The same issue applies when a first pool is becoming full. Data in a full pool is copied in its entirety and then subsequently moved into a larger pool. This type of move can be inefficient because data that does not need to be moved will inevitably be moved. The problem is exacerbated when volumes are striped. Striping data for a volume across pools provides many advantages, such as parallel reads and writes for faster I/O processing, However, if striped data needs to be moved from one full pool to a free pool, then either the full stripe needs to be copied, which is unnecessary, or the number of stripes need to be changed, which means the striped data from other pools in the same cluster will also have to be moved in order to make the striping consistent after the initial data move from the full pool to the free pool. Thus, conventional systems do not have a way to increase volume size or free up a full pool without moving excess amounts of data.

Techniques and mechanisms described herein facilitate dynamic volume storage adjustment. According to various embodiments, volumes and replicas are stored as one or more "chunks" across storage nodes in a storage cluster. As used herein, a "chunk" is a modified portion of virtual storage space that functions as a basic unit of a volume. In some embodiments, a volume can be one entire chunk or multiple chunks. In some embodiments, each chunk in a volume is exactly the same size. However, in various embodiments, the size of a chunk can be adjusted or modified on the fly or on demand. However, in such embodiments, once a chunk size in a volume is changed, each chunk in the volume is also changed to that size. In some embodiments, reducing the chunk size shrinks the size of the volume, unless the number of chunks in the volume is increased to keep the volume the same size. Similarly, in some embodiments, increasing a chunk size would increase the size of the volume, unless the number of chunks in the volume is reduced.

In some configurations, it may also be necessary or desired to increase the replication factor of a virtual storage volume while the virtual storage volume is in use. For example, an increased replication factor may help to accommodate an increase in I/O traffic for the virtual storage volume over time. In another example, it may be necessary to increase the replication factor temporarily during an operation, while a new copy (replica) is being created. After the operation completes, the system removes another copy in order to maintain the replication factor while moving a "replica" to a new pool and removing the "replica" from an existing pool.

Techniques and mechanisms described herein facilitate the increase in virtual storage volume replication factor. According to various embodiments, the increase in a virtual storage volume's replication factor may be divided into two phases. In the transfer phase, one or more snapshots are used to iteratively copy data from the virtual storage volume to a newly added replica of the virtual storage volume. In the resynchronization phase, recently changed data is synchronized between the virtual storage volume and the newly added replica.

In some embodiments, techniques and mechanisms described herein facilitate the increase in virtual storage volume replication factor without the attendant disruption associated with conventional approaches. For example, the replication factor of a virtual storage volume may be increased without blocking access to the virtual storage volume. Thus, techniques and mechanisms described herein provide for more efficient scaling of virtual storage volumes, which allows for the more efficient usage of computing resources. Accordingly, embodiments of the claimed disclosure provide for the improved performance of the computer and distributed computing system itself.

In some implementations, techniques and mechanisms described herein may provide one or more of the following technical advantages. First, the replication factor of a volume may be increased without incurring volume downtime. Second, data may be transferred in parallel, providing for rapid increase in the replication factor. Third, data transfer speeds may be configured, providing for configurability and efficiency in the use of computing resources. Fourth, procedures described herein may be restarted in the sense that they may be resumed in place after the failure and restarting of any of the source or target replicas.

Techniques and mechanisms described herein facilitate the operation of a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

In some embodiments, each compute node may include a storage driver configured to facilitate access between applications loaded on the compute node and one or more storage volumes mounted on the compute node. The storage driver may be implemented as a containerized application having special permissions beyond those typically accorded to containerized applications in the system, a configuration referred to herein as a privileged storage container. Techniques and mechanisms related to privileged storage containers are discussed in further detail with respect to FIG. 6.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately, or additionally, such a storage system may be referred to herein as a "clustered storage system."

FIG. 1 illustrates an example of an arrangement of components in a containerized storage system 100, configured in accordance with one or more embodiments. The storage system 100 includes a clustered key-value database (KVDB) 102 in communication with a plurality of application nodes application nodes 104, 106, and 108. Each node has implemented thereon a storage driver 124 and a kernel module 128. Each node has access to zero or more storage pools such as the storage pools A1 132, A2 142, B1 152, and N1 162. Each storage pool includes zero or more virtual storage volumes such as the virtual storage volumes V1-1 170, V2-1 172, and V1-2 174. Each virtual storage volume includes storage space on one or more disks associated with the storage pool such as the disks A1-1 134, A1-2 136, A1-3 138, A2-1 144, A2-2 146, N1-1 164, N1-2 166, B1-1 154, B1-2 156, and B1-3 158.

In some embodiments, KVDB 102 is configured to serve as the single source of truth for an entire cluster. In some embodiments, KVDB 102 maintains cluster membership information as well as configuration for every volume. In some embodiments, KVDB 102 also maintains a monotonically increasing cluster version number. In such embodiments, this version number ensures update and communication order in a distributed system.

In some embodiments, KVDB 102 communicates with nodes 104, 106, and 108 solely in a control path. In such embodiments, KVDB 102 is not in the datapath for the nodes. In some embodiments, KVDB 102 is configured to be periodically snapshotted and the key-value space is also periodically saved. Thus, in such embodiments, KVDB 102 can be reconstructed in case of a disaster.

In some embodiments, each volume in the cluster has access, either via KVDB 102, via direct communication with other nodes, or via data stored in a database, to information related to the volume's mapping. In some embodiments, such information can include how many "chunks" comprise each volume. In some embodiments, each chunk represents a range of contiguous offsets. In some embodiments, each offset can belong to one chunk.

In some embodiments, each chunk may have one or more "replication sets." In some embodiments, each replication set comprises a set of nodes (or pools) which have the same data replicated. In some embodiments, data itself may be striped within chunks. In some embodiments, the chunk size must be a multiple of the stripe size in case data is striped within a chunk.

According to various embodiments, the clustered storage system 100 shown in FIG. 1 may be implemented in any of various physical computing contexts. For example, some or all of the components shown in FIG. 1 may be implemented in a cloud computing environment such as Amazon Web Services (AWS), Microsoft Azure, or Google Cloud. As another example, some or all of the components shown in FIG. 1 may be implemented in a local computing environment such as on nodes in communication via a local area network (LAN) or other privately managed network.

Figure 5:
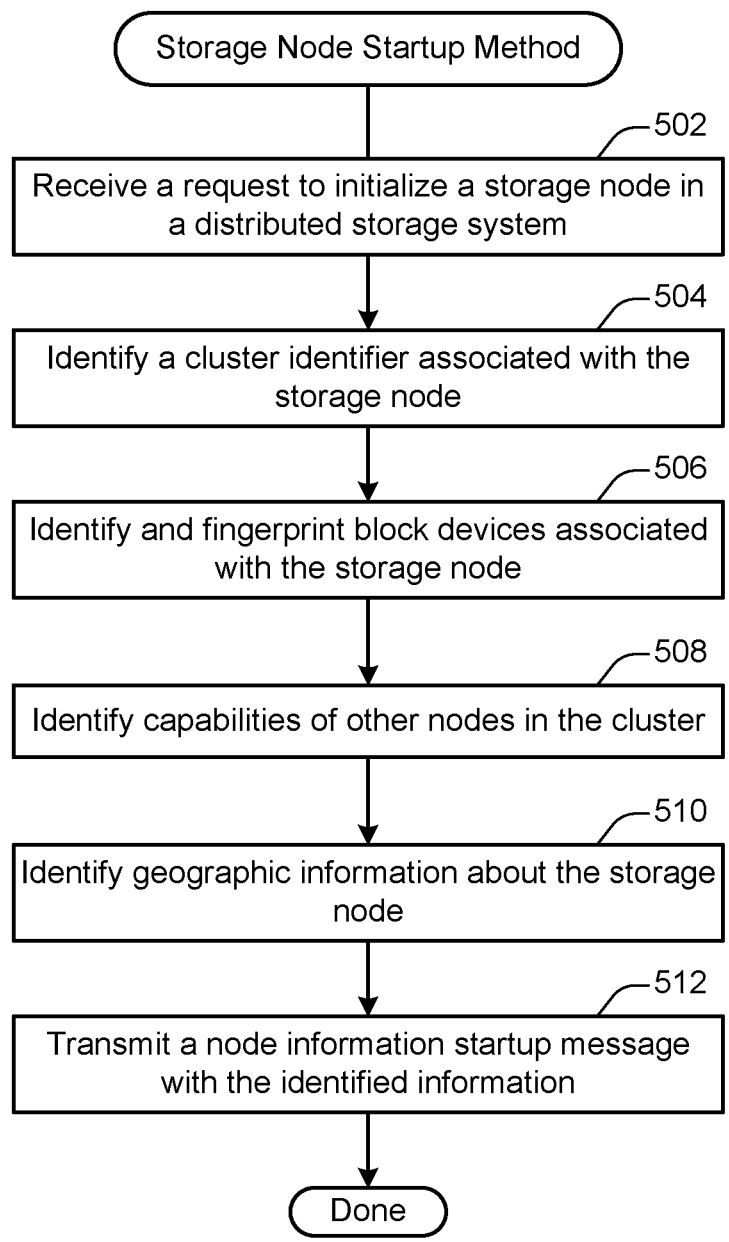
FIG. 5 illustrates a flow chart of an example of a method for starting up a storage node, in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 6.

According to various embodiments, each node may be configured to instantiate and execute one or more containerized application instance. Each node may include many components not shown in FIG. 1. These components may include hardware components, such as those discussed with respect to FIG. 5, and/or software components, such as those discussed herein.

According to various embodiments, each node may include a storage driver 124. The storage driver 124 may perform any of various types of storage-related operations for the node. For example, the storage driver 124 may facilitate the mounting or unmounting of virtual storage volumes. As another example, the storage driver 124 may facilitate data storage or retrieval requests associated with a mounted virtual storage volume. The storage driver 124 may be substantially similar or identical to the privileged storage container 616 shown in FIG. 6.

In some embodiments, each node may include a kernel module 128. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, a storage pool may provide access to physical storage resources for a storage node. Each storage node may include some number of disks. The disks may be accessible to the storage nodes via a network. For example, the disks may be located in storage arrays containing potentially many different disks. In such a configuration, which is common in cloud storage environments, each disk may be accessible for potentially many nodes to access. A storage pool such as the pool 132 may include potentially many different disks.

According to various embodiments, the virtual storage volumes 170, 172, and 174 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some implementations, each virtual storage volume may include one or more replicas. For example, the storage volume V1-1 170 on the Node A 104 includes the replica V1-2 174 on the Node B 106. Replicating a virtual storage volume may offer any of various computing advantages. For example, each replica may be configured to respond to data read requests, so increasing the replication factor may increase read access bandwidth to the virtual storage volume. As another example, replicas may provide redundancy in the event of a software and/or hardware failure associated with the storage volume.

Figure 2:
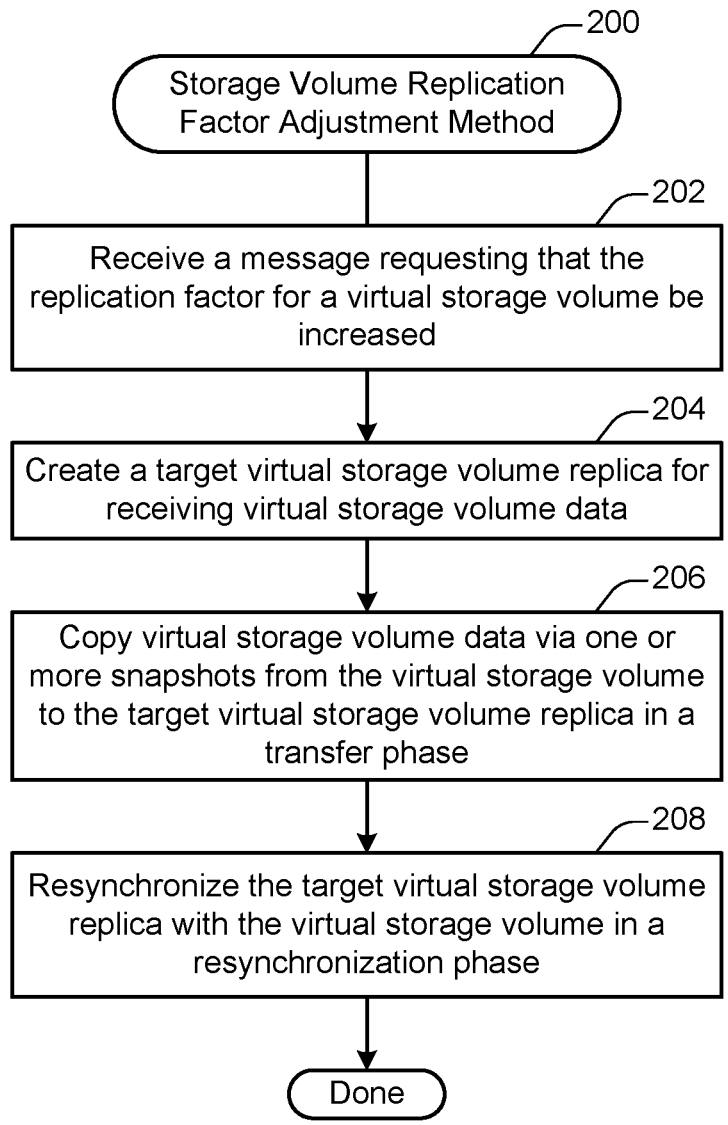
FIG. 2 illustrates an example of a storage volume replication factor adjustment method, performed in accordance with one or more embodiments.

FIG. 2 illustrates an example of a storage volume replication factor adjustment method 200, performed in accordance with one or more embodiments. According to various embodiments, the method 200 may be performed when a request is received at operation 202, to increase the replication factor for a virtual storage volume. For instance, a request may be received to increase the replication factor of the storage volume V1 shown in FIG. 1 to include an additional replica on the Node N 108.

In particular embodiments, such a request may be generated manually, for instance by a systems administrator. Alternately, such a request may be generated automatically. For instance, an application may transmit a request to increase the replication factor of a storage volume when a designated I/O threshold is reached. In another instance, an existing replica may go down, so the system removes the "down" replica (e.g., decrease the replication factor) and then adds a new replica (e.g., increase the replication factor).

According to various embodiments, various operations associated with FIG. 2 may be performed at any of several nodes, such as the Node A 104, Node B 106, and/or Node N 108 shown in FIG. 1. The coordinator may perform any or all of various command and control functions for the replicated storage volume. For example, the coordinator may transmit instructions to increase or decrease the replication factor of the storage volume. As another example, the coordinator may receive requests to write data to the storage volume and then transmit those requests to each of the replicas in order to maintain data consistency and integrity across the replicas.

In some configurations, the coordinator node 104 may be a distinct node without an attached replica of the storage volume. Alternately, the coordinator node 104 may include a replica of the storage volume. For example, in the system 100 shown in FIG. 1, the coordinator node may be implemented as a module on the Node A 104 or the Node N 106.

A target virtual storage volume replica is created for receiving virtual storage volume data at 204. The target virtual storage volume replica may be created by performing any or all of a range of suitable operations. The target virtual storage volume replica may be provisioned with a size suitable for receiving the virtual storage volume data. For example, different replicas associated with the same storage volume may be maintained at comparable sizes to facilitate data and performance consistency across the replicas.

At 206, virtual storage volume data is copied via one or more snapshots from the virtual storage volume to the target virtual storage volume replica in a transfer phase. Techniques associated with the copying of data via one or more snapshots are discussed in additional detail with respect to the method 300 shown in FIG. 3.

At 208, the target virtual storage volume replica is resynchronized with the virtual storage volume in a resynchronization phase. Techniques associated with the resynchronization of a target virtual storage volume replica with the virtual storage volume are discussed in additional detail with respect to the method 400 shown in FIG. 4.

Figure 3:
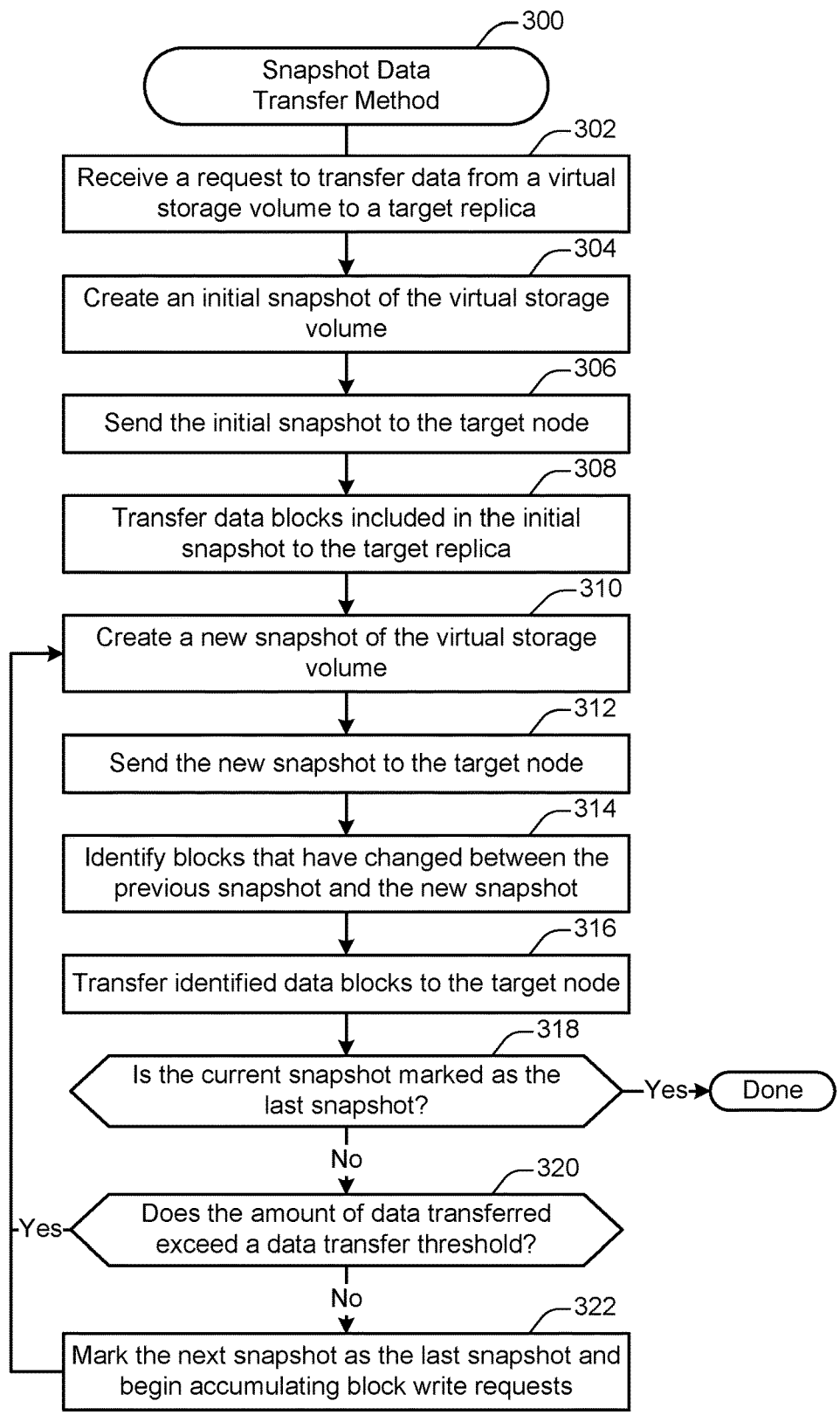
FIG. 3 illustrates an example of a method for transferring data via one or more snapshots, performed in accordance with one or more embodiments.

FIG. 3 illustrates an example of a method 300 for transferring data via one or more snapshots, performed in accordance with one or more embodiments. The method 400 may be performed at one or more components of the system 100 shown in FIG. 1.

In some embodiments, the method 300 may be initiated when a request is received at operation 302 to transfer data from a virtual storage volume to the target replica. For example, a request may be received to increase the replication factor the virtual storage volume by adding a target replica, such as a new replica for the Volume V2 on the Node N 108 shown in FIG. 1.

A new snapshot is created at operation 304. According to various embodiments, creating a new snapshot may involve constructing a list of blocks included within a snapshot at a designated point in time. For example, the storage driver may maintain a table of block identifiers and block locations to facilitate access to the data blocks. Because the volume is implemented within a copy-on-write framework, subsequent data write requests that write to the data blocks included within the snapshot will not lead to the corruption of the snapshot. Techniques for copy-on-write data management are discussed with respect to FIG. 7.

At 306, the initial snapshot is sent to the target node. In some implementations, transmitting the initial snapshot to the target node may involve sending a message with an identifier associated with the initial snapshot. In addition, the target node may receive a list of the block identifiers for blocks included in the snapshot.

308, the data blocks included in the initial snapshot are transferred to the target replica. According to various embodiments, the blocks may be transferred via any suitable transfer procedure. For example, the list of data blocks may be divided into chunks. The chunks may then be retrieved in parallel from each previously created virtual storage volume replica. When a block is retrieved, the data may be stored on the target replica. Although a block may keep the same identifier when transferred from the volume to the target replica, the location at which it is stored will be different because the target replica employs different hardware storage resources than the source volume, as discussed with respect to FIG. 1.

After transferring the data blocks included in the initial snapshot to the target replica, the target replica is synchronized with the source volume up to the point in time when the initial snapshot was captured. However, the source volume may have continued to receive data write requests after the initial snapshot was generated. Accordingly, at operation 310, a new snapshot is created.

According to various embodiments, the generation of the new snapshot may be performed in a manner substantially similar to the generation of the initial snapshot at operation 304. After the new snapshot is generated, it is sent to the target node at operation 312 in a manner substantially similar to that in which the initial snapshot is sent at operation 306.

At 314, blocks that have changed between the previous snapshot and the new snapshot are identified. According to various embodiments, the changed blocks may be identified by any suitable method. For example, block identifiers in the previous and new snapshots may be compared to identify newly added or removed blocks. In some implementations, the identification of changed blocks may be performed by a node associated with the source volume. Alternately, or additionally, the target node may identify changed or newly added blocks.

After the blocks are identified, they are transferred from the virtual storage volume to the target replica at operation 316. According to various embodiments, the transfer of the identified data blocks may be performed in a manner substantially similar to that discussed with respect to the operation 314.

At 318, a determination is made as to whether the current snapshot is marked as the last snapshot. According to various embodiments, such a marking may occur in a previous iteration at operation 322. For example, if it is determined that the amount of data transferred exceeds a designated data transfer threshold at operation 320, then the next snapshot may be marked as the last snapshot at operation 322.

In some embodiments, the procedure 300 may terminate after the processing of the last snapshot. At this point, the amount of data transferred has fallen to an acceptably low point such that the state of the target replica is relatively close to that of the other replicas in the virtual storage volume. Accordingly, the target replica may be synchronized directly via a resynchronization process as described with respect to the method 400 shown in FIG. 4 based at least in part on the block write requests accumulated at operation 322.

If the current snapshot is not marked as the last snapshot, then a determination is made at 320 as to whether the amount of data transferred at operation 316 exceeds a data transfer threshold. If so, then at least two additional iterations of the snapshot data transfer method are performed.

In some implementations, the data transfer threshold may be specified in blocks, bytes, or any suitable unit of measure. The specific value used for the data transfer threshold may be strategically determined based on any of a number of considerations, which may include, but are not limited to: a storage volume size associated with the virtual storage volume and/or an amount of data written to the virtual storage volume during a designated period of time.

When the current snapshot is marked as the last snapshot at operation 318, the next snapshot is marked as the last snapshot and subsequent data write requests received are accumulated at operation 322. According to various embodiments, marking the next snapshot as the last snapshot may involve setting any suitable indicator such that the procedure terminates after the next execution of the operation 318.

In some implementations, block write requests are received by a coordinator node and then transferred to each node that has a replica of the virtual storage volume. Accordingly, block write requests may be accumulated by including the target node in the distribution of block write requests received after the last snapshot is generated. Each block write request may include information such as data to write to disk and a location such as one or more block identifiers at which to write the data.

In particular embodiments, block write requests may be executed in a sequential manner since one block write request may modify a data block written to by a previously received block write request. Accordingly, the block write requests may be accumulated in the sense that the target node may not actually execute the block write requests until the target node is fully synchronized with the virtual storage volume. During the accumulation process, the data write requests may continue to be executed as usual by replicas of the virtual storage volume other than the target replica. The resynchronization process is discussed in further detail with respect to FIG. 4.

Figure 4:
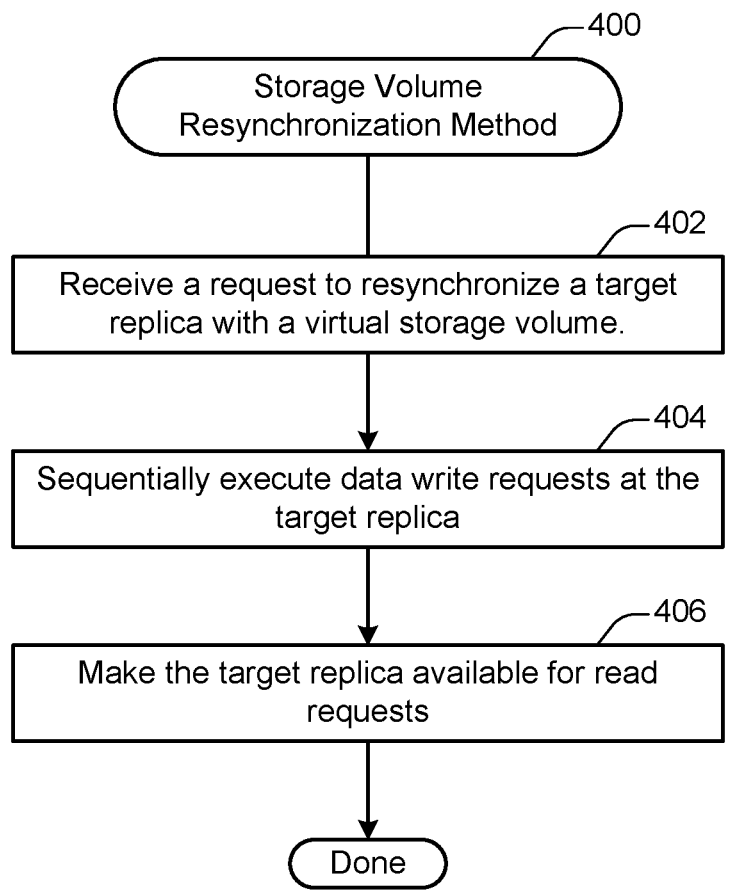
FIG. 4 illustrates an example of a method of resynchronizing a storage volume, performed in accordance with one or more embodiments.

FIG. 4 illustrates an example of a method 400 of resynchronizing a storage volume, performed in accordance with one or more embodiments. The method 400 may be performed at a replica node, such as the Node 106 shown in FIG. 1.

In some implementations, the method 400 may be performed when a request is received at 402 to resynchronize a target replica with a virtual storage volume. For example, such a request may be received as discussed at operation 208 after virtual storage volume data has been copied from the virtual storage volume to the virtual storage volume replica as described with respect to operation 206 shown in FIG. 2.

At 404, data write requests received at the target replica are executed. In some implementations, the data write requests executed at operation 404 may include those accumulated at operation 322. As discussed with respect to operation 322, accumulated data write requests may be transferred to the target replica for later execution.

According to various embodiments, the data write requests requests may be executed sequentially. For example, a particular data write requests may modify a data block that is later overwritten by a subsequent write request. Accordingly, data synchronicity across the replicas may be maintained by executing write requests in the order in which they are received.

In particular embodiments, one or more operations shown in FIG. 3 may be performed in parallel or in an order different than that shown. For example, a set of data write requests may be executed in parallel if the data blocks written by the data write requests do not overlap.

At 406, the target replica is made available for read requests. In some implementations, after the data write requests are executed, the target replica has a complete copy of the virtual storage volume and is effectively identical to the source replicas of the virtual storage volume.

FIG. 5 illustrates a flow chart of an example of a method for starting up a storage node, in accordance with embodiments of the present disclosure. Accordingly, a method, such as method 500, may be implemented to initialize a storage node when that node joins a cluster and becomes available to implement data storage operations. As will be discussed in greater detail below, such an initialization process may include the identification of data associated with various other nodes in the cluster, and such data may be used to generate a cluster hierarchy.

At 502, a request to initialize a storage node in a distributed storage system may be received. According to various embodiments, the request to initialize a new storage container node may be generated when a storage container node is activated. For instance, an administrator or configuration program may install a storage container on a server instance that includes a container engine to create a new storage container node. In various embodiments, the storage node may be included in a distributed storage system. In one example, the distributed storage system may implement storage nodes in clusters. Accordingly, the administrator or configuration program may provide a cluster identifier indicating a cluster to which the storage container node should be added. The storage container node may then communicate with the discovery service to complete the initialization.

At 504, a cluster identifier associated with the storage node may be identified. According to various embodiments, as similarly discussed above, the cluster identifier may be included with the received request. Alternately, or additionally, a cluster identifier may be identified in another way, such as by consulting a configuration file. Accordingly, the cluster identifier may be identified and retrieved based on the request, a configuration file, or from any other suitable source.

At 506, block devices associated with the storage node may be identified. In various embodiments, the block devices may be devices used to store storage volumes in a storage node. Accordingly, a particular storage node may be associated with several block devices. In various embodiments, the block devices associated with the storage node being initialized may be identified based on an input provided by the administrator, or based on a configuration file. In one example, such a configuration file may be retrieved from another node in the identified cluster.

Moreover, the identified block devices may be fingerprinted. In various embodiments, the fingerprinting may identify capabilities of various storage devices, such as drives, that may be utilized by the block devices and/or accessible to the storage node. Such storage devices may be solid state drives (SSDs), solid state hybrid drives (SSHDs), or hard disk drives (HDDs). Types of connections with such storage devices may also be identified. Examples of such connections may be any suitable version of SATA, PATA, USB, PCI, or PCIe. In some embodiments, an input/output (I/O) speed may be inferred based on the device type and connection type. In this way, it may be determined how many storage devices are available to the storage node, how much available space they have, and what type of storage devices they are, as well as how they are connected.

As discussed above, fingerprinting data may include information about underlying physical devices, such as device capacity, I/O speeds and characteristics, as well as throughput and latency characteristics. In various embodiments, such fingerprinting data may be generated based on benchmarking tools that may be implemented and run dynamically, or may have been run previously, and had results stored in a metadata server. In some embodiments, such fingerprinting data may be retrieved from a location in the cloud environment, such as the metadata server or an API server, and such data may be retrieved during the startup process. In various embodiments, such data may be retrieved from a remote location that may include technical specifications or characteristics of the underlying physical devices which may have been determined by a component manufacturer.

At 508, capabilities of other nodes in the cluster may be identified. As discussed above, such capabilities of the other nodes may identify how many storage devices are available to those storage nodes, how much available space they have, and what type of storage devices they are, as well as how they are connected. In various embodiments, capabilities of the other nodes may be one or more performance characteristics, such as I/O capabilities and speeds. Such capabilities may be determined based on devices types of underlying physical devices. For example, a particular type of device may be identified, such as SSDs, and a particular I/O speed may be identified based on the identified device type. As discussed above, capabilities may also be other characteristics of the nodes, such as a storage capacity of the node, which may be determined based on available storage in one or more underlying physical devices. It will be appreciated that storage capacity may refer to total and/or free capacity of a particular storage node, a particular storage device, and/or a particular storage volume. In various embodiments, such capabilities may be determined based on data included in a configuration file which may be propagated among nodes in the cluster. In some embodiments, the identified capabilities and other information are available as labels, as described later in the application.

At 510, geographic information about the storage node may be identified. In various embodiments, the geographic information may be particular geographical characteristics of a physical location of the storage node. For example, such geographic information may include a first identifier that identifies a rack, or other physical device unit, in which the storage node is located. The geographic information may also include a second identifier that identifies a zone, which may be a particular data center. The geographic information may further include a third identifier that identifies a region or geographical area in which the storage node is located. In various embodiments, such geographic information may be stored at each node, and may be determined based on a query issued to a metadata server. Accordingly, the query to the metadata server may be used by the metadata server to determine geographic information, and such geographic information may be provided to the storage node where it is maintained. In some embodiments, a scheduler may be implemented to maintain such geographic information. In various embodiments, geographic regions may be defined by an entity, such as an administrator, or based upon one or more designated regions, such as a time zone or other designated region such as "Eastern U.S.". While examples of a first, second, and third identifier have been described, any suitable number of identifiers may be used.

At 512, a node information startup message may be transmitted. In various embodiments, the node information startup message may include the identified information. Accordingly, the previously described information may be included in a message and may be transmitted to one or more other nodes in the cluster. In this way, the information associated with the storage node that has been initialized may be propagated to other nodes within the cluster.

Figure 6:
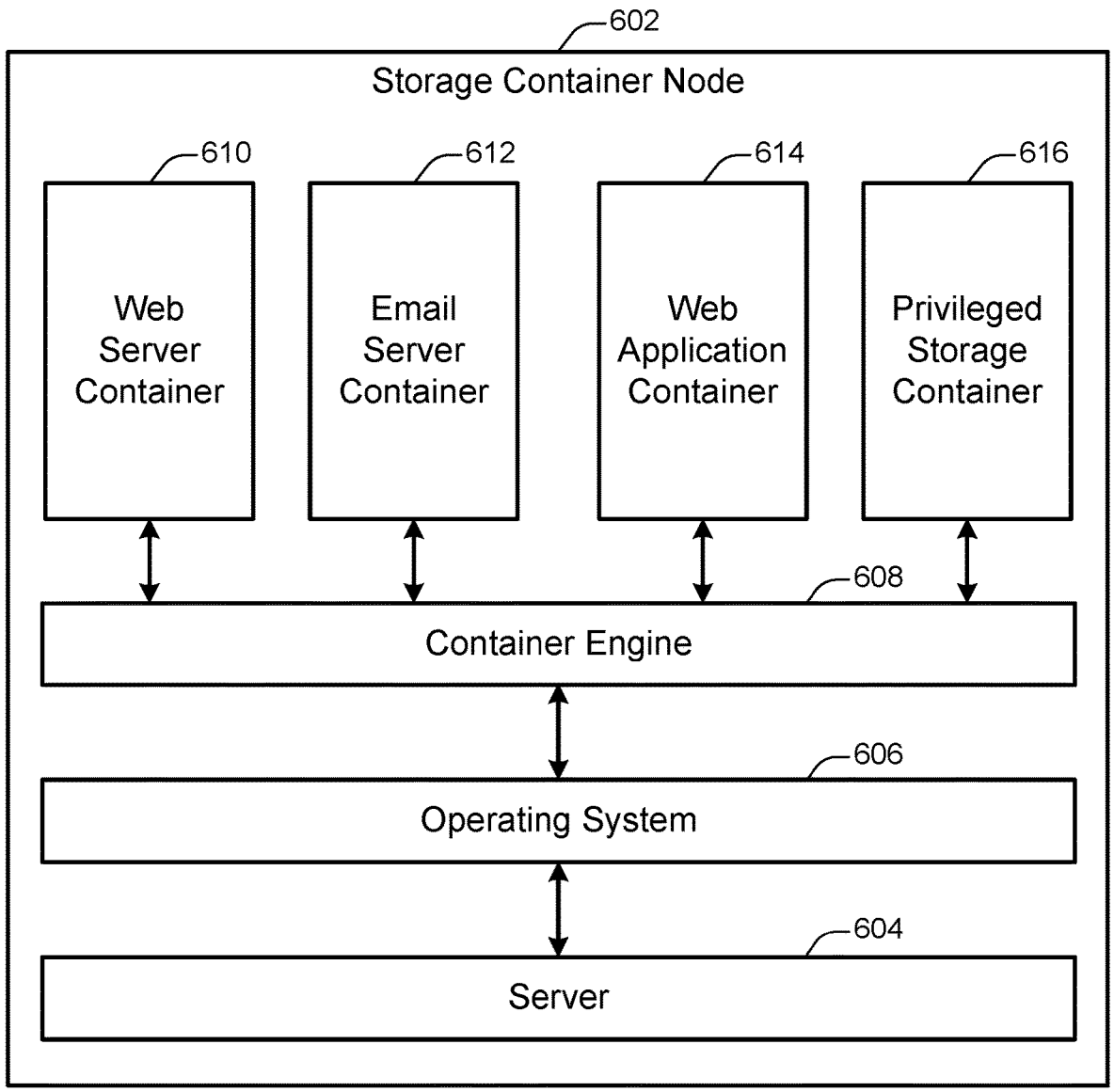
FIG. 6 illustrates an example of a storage container node, configured in accordance with one or more embodiments.

FIG. 6 illustrates an example of a storage container node 602. According to various embodiments, a storage container node may be a server configured to include a container engine and a privileged storage container. The storage container node 602 shown in FIG. 6 includes a server layer 604, an operating system layer 606, a container engine 608, a web server container 610, an email server container 612, a web application container 614, and a privileged storage container 616.

In some embodiments, the storage container node 602 may serve as an interface between storage resources available at a server instance and one or more virtual storage volumes that span more than one physical and/or virtual server. For example, the storage container node 602 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 602 may serve as an interface between storage resources available at a server instance and one or more virtual storage volumes that are replicated across more than one physical and/or virtual server. For example, the storage container node 602 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 604, the server layer is shown. According to various embodiments, the server layer may function as an interface by which the operating system 606 interacts with the server on which the storage container node 602 is implemented. A storage container node may be implemented on a virtual or physical server. For example, the storage container node 602 may be implemented at least in part on the server shown in FIG. 5. The server may include hardware such as networking components, memory, physical storage devices, and other such infrastructure. The operating system layer 606 may communicate with these devices through a standardized interface provided by the server layer 604.

At 606, the operating system layer is shown. According to various embodiments, different computing environments may employ different operating system layers. For instance, a physical or virtual server environment may include an operating system based on Microsoft Windows, Linux, or Apple's OS X. The operating system layer 606 may provide, among other functionality, a standardized interface for communicating with the server layer 604.

At 608, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 604, an operating system layer 606, and a container engine layer 608 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 602 includes the web server container 660, the email server container 612, and the web application container 614. A software container may include customized computer code configured to perform any of various tasks. For instance, the web server container 660 may provide files such as webpages to client machines upon request. The email server 612 may handle the receipt and transmission of emails as well as requests by client devices to access those emails. The web application container 614 may be configured to execute any type of web application, such as an instant messaging service, an online auction, a wiki, or a webmail service. Although that storage container node 602 shown in FIG. 6 includes three software containers, other storage container nodes may include various numbers and types of software containers.

At 616, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 610, 612, and 614 or other software containers located in different computing environments. For example, a software container may transmit a storage request to the container engine 608 via a standardized interface. The container engine 608 may transmit the storage request to the privileged storage container 616. The privileged storage container 616 may then communicate with privileged storage containers located on other storage container nodes and/or may communicate with hardware resources located at the storage container node 602 to execute the request. In some configurations, a privileged storage container is referred to herein as a scheduler agent.

In some implementations, one or more software containers may be afforded limited permissions in the computing environment in which they are located. For example, in order to facilitate a containerized software environment, the software containers 610, 612, and 614 may be restricted to communicating directly only with the container engine 608 via a standardized interface. The container engine 608 may then be responsible for relaying communications as necessary to other software containers and/or the operating system layer 606.

In some implementations, the privileged storage container 616 may be afforded additional privileges beyond those afforded to ordinary software containers. For example, the privileged storage container 616 may be allowed to communicate directly with the operating system layer 606, the server layer 604, and/or one or more physical hardware components such as physical storage devices. Providing the storage container 616 with expanded privileges may facilitate efficient storage operations such as storing, retrieving, and indexing data.

Figure 7:
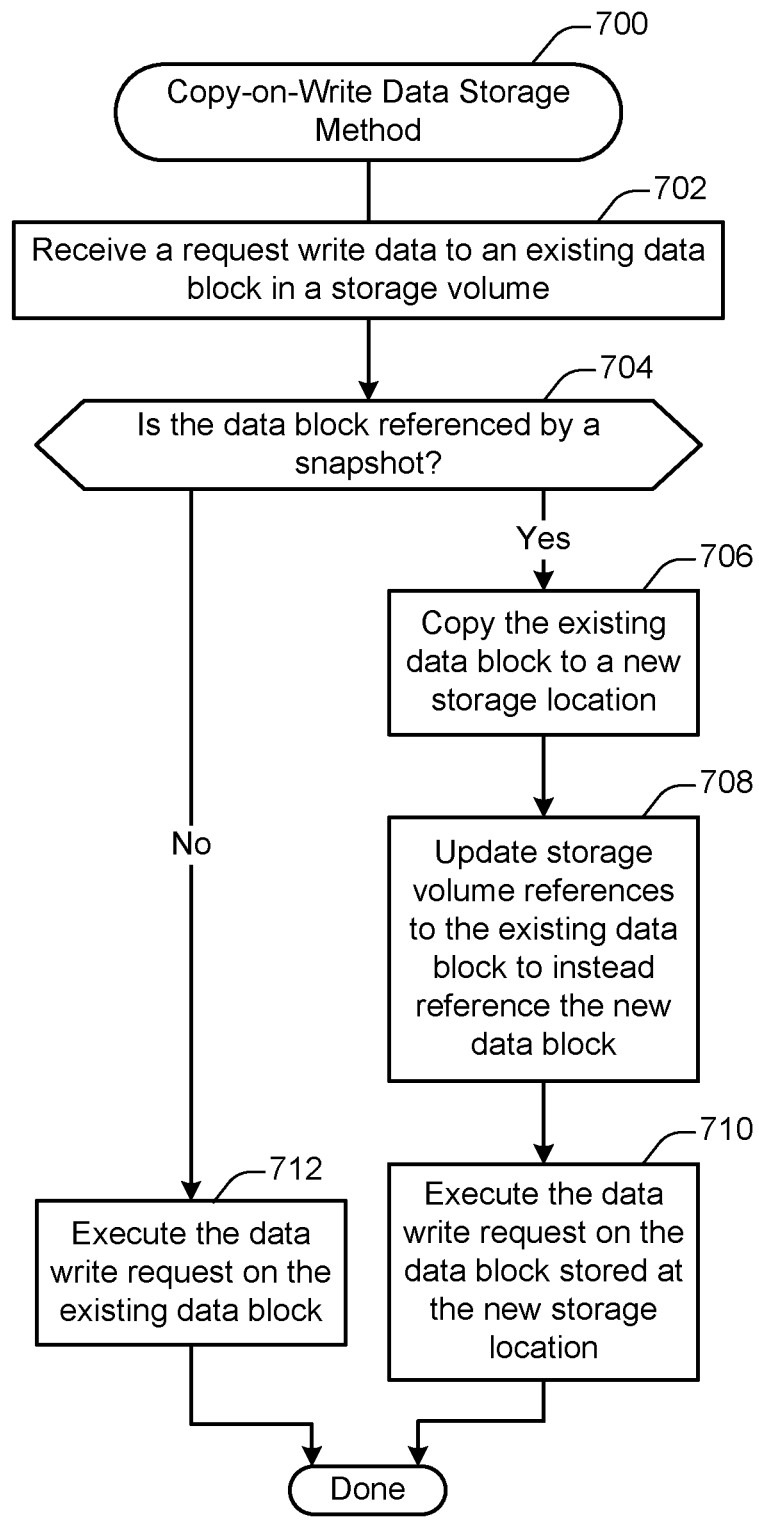
FIG. 7 illustrates an example of a method for storing data in a copy-on-write storage system, performed in accordance with one or more embodiments.

FIG. 7 illustrates an example of a method 700 for storing data in a copy-on-write storage system, performed in accordance with one or more embodiments. According to various embodiments, the method 700 may be performed in order to execute a write request that changes the state of data on a storage volume.

A request to write data to an existing data block in a storage volume is received at operation 702. In some embodiments, the request may include information such as a reference to a storage location of the data block, data to write to the data block, and a portion of the data block to be overwritten.

At 704, a determination is made as to whether the data block is referenced by a snapshot. According to various embodiments, the determination may be made at least in part by consulting a table that lists references to data blocks stored in association with the storage volume. If the data block is not referenced by a snapshot, then the data write request may be executed on the existing data block at operation 712.

If instead the data block is referenced by a snapshot, then at 706 the existing data block is copied to a new storage location. Storage volume references to the existing data block are then updated to refer to the new data block at the new storage location at operation 708. The references that are updated may exclude those that are included in a snapshot so that the snapshots continue to refer to the existing data block as it is maintained in its previous state.

At 710, the data write request is executed on the data block stored at the new storage location. According to various embodiments, executing the data write request may involve writing the data identified in the request received at 702 to the appropriate location within the data block.

Figure 8:
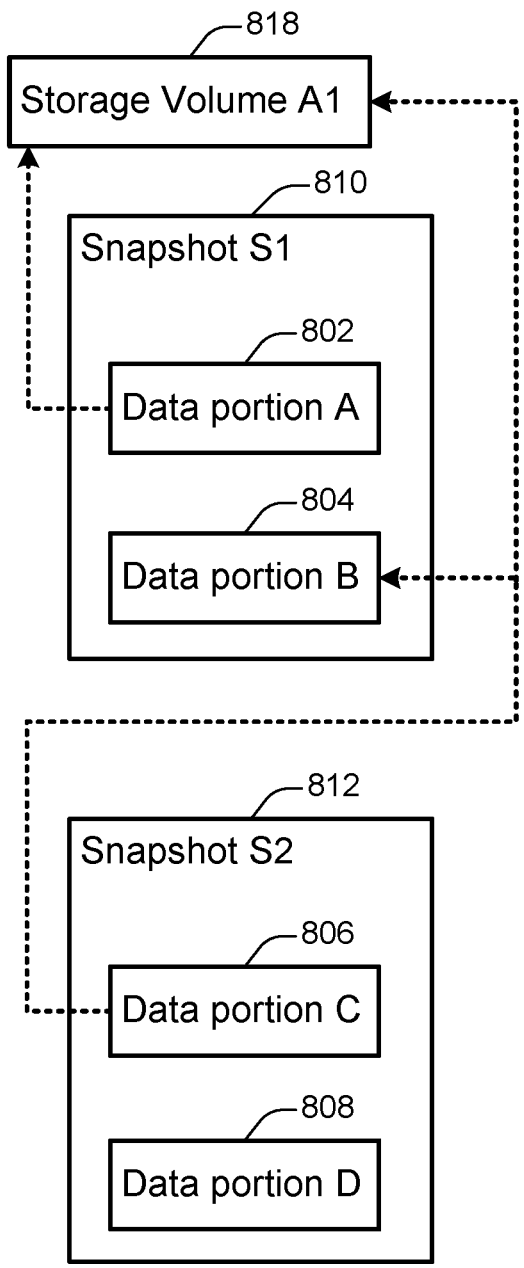
FIG. 8 illustrates an example of a configuration of data, provided in accordance with one or more embodiments.

FIG. 8 illustrates an example of a configuration of data, provided in accordance with one or more embodiments. The configuration of data shown in FIG. 8 includes Snapshot S1 810 and Snapshot S2 812, both of which correspond to Volume A1 818. The snapshots included data portions A-D 802-808.

According to various embodiments, a virtual storage volume may include some number of data blocks. Some of those data blocks may be associated with a current state of the virtual storage volume. Other data blocks may be associated with a previous state of the virtual storage volume. For instance, these other data blocks may have been overwritten by subsequent data write requests.

In some implementations, in order to perform operations such as restoring the virtual storage volume to a previous state and/or increasing a replication factor of a virtual storage volume, a request to overwrite a data block may be implemented as a copy-on-write, in which the original data is duplicated prior to executing the write request. In this way, the data block exists in both its overwritten and previous state, which facilitates the creation of snapshots capable of being used to restore the storage volume to a state at a particular point in time.

According to various embodiments, a snapshot itself may include a list of identifiers associated with data blocks associated with the virtual storage volume. Snapshots may be captured in a sequentially significant manner. In the example configuration shown in FIG. 8, the Snapshot S1 810 represents the first snapshot captured of the Volume A1 818. The data included in the Snapshot S1 810 includes two portions. The data portion A 802 includes data blocks that currently remain in Volume A1 818. Because the data blocks included in data portion A 802 are still in Volume A1 818, the Snapshot S1 810 does not store a copy of the data blocks included in data portion A 802. Instead, the data portion A 802 is stored as a set of one or more references to the data blocks as they reside in the Volume A1. For example, a reference may act as a memory pointer, which typically requires substantially less storage space than the memory to which it refers.

The data portion B 804 includes data blocks that were present in the Volume A 818 at the time the Snapshot S1 810 was captured but is no longer present in the Volume A 818 at the current point in time. A copy of this data is stored in association with the Snapshot S1 810 so that it is available if a request to restore the system to the state represented in the Snapshot S1 810 is received.

The Snapshot S2 812 represents the second snapshot captured of the Volume A1 818. The data blocks included in the Snapshot S2 812 include two portions. The data portion C 806 includes data blocks included in the Snapshot S1 810. Because the data blocks included in data portion C 806 are still in the Snapshot S1 810, the Snapshot S2 812 does not store a copy of the data blocks included in data portion C 806. Instead, the data portion C 806 is stored as a set of one or more references to the data blocks as they reside in the Snapshot S2 812.

In particular embodiments, the references in the data portion C 806 may be pointers to data blocks stored in the Snapshot S1 810 (e.g., in the data portion B 804) or may be pointers to references to data blocks stored in the storage volume A1 818. For example, some of these references may point to data blocks stored by value in the Snapshot S1 810 (i.e. in the data portion B 804) that no longer remain in the Storage Volume A1 818. As another example, other references may point to data blocks that do remain in the Storage Volume A1 818. Thus, the data portion C 806 and the data portion A 802 may include some of the same references to data blocks that remain in the storage volume A1 818.

Given the architecture presented above, users can create virtual volumes which can be attached as a block device on any node. These virtual volumes can have sizes that are greater than the size of any actual drive, storage pool, or sum of storage pools. Because of virtual nature of the volumes, nodes and pools can become "full," since over-provisioning is allowed in many virtual storage systems. In order to take advantage of efficient data migration, the architecture must be able to allow for moving portions of a volume from one set of nodes to another set of nodes, or from one set of pools to another set of pools. In addition, because users can create their own volumes, it may be advantageous for the architecture to be configured to allow users to increase the size of the volumes without taking the volume offline.

According to various embodiments, in order to take advantage of the techniques and mechanisms described herein, a virtual storage system architecture can be implemented as described below. In some embodiments, a distributed system includes a central key-value-database store, such as KVDB 102, that is accessible to all nodes in the cluster at all times. In some embodiments, each volume will have information about its mapping. In some embodiments, each volume may have one or more chunks, with each chunk being the same size. In some embodiments, each chunk represents a range of contiguous offsets. In some embodiments, each offset can belong to only one chunk. In some embodiments, each chunk may have one or more replication sets. In some embodiments, each replication set is a set of nodes (or pools) which have the same data replicated. In some embodiments, data itself may be striped within a chunk. In some embodiments, the chunk size must be a multiple of stripe size, in case data is striped within a chunk.

Figure 9A:
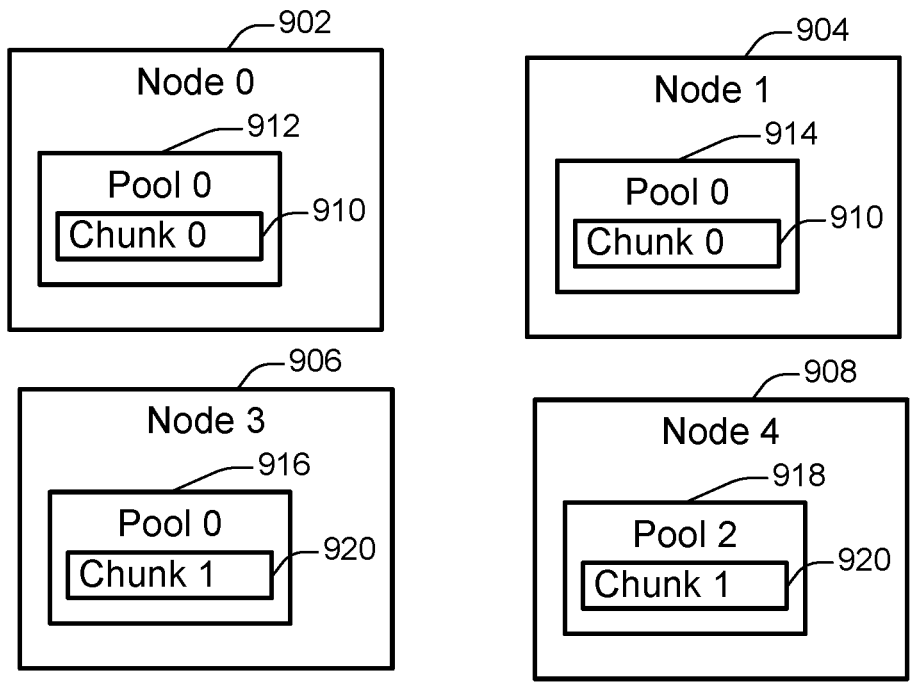
FIGS. 9A-9B illustrate an example of increasing the size of a storage volume, in accordance with one or more embodiments.
Figure 9B:
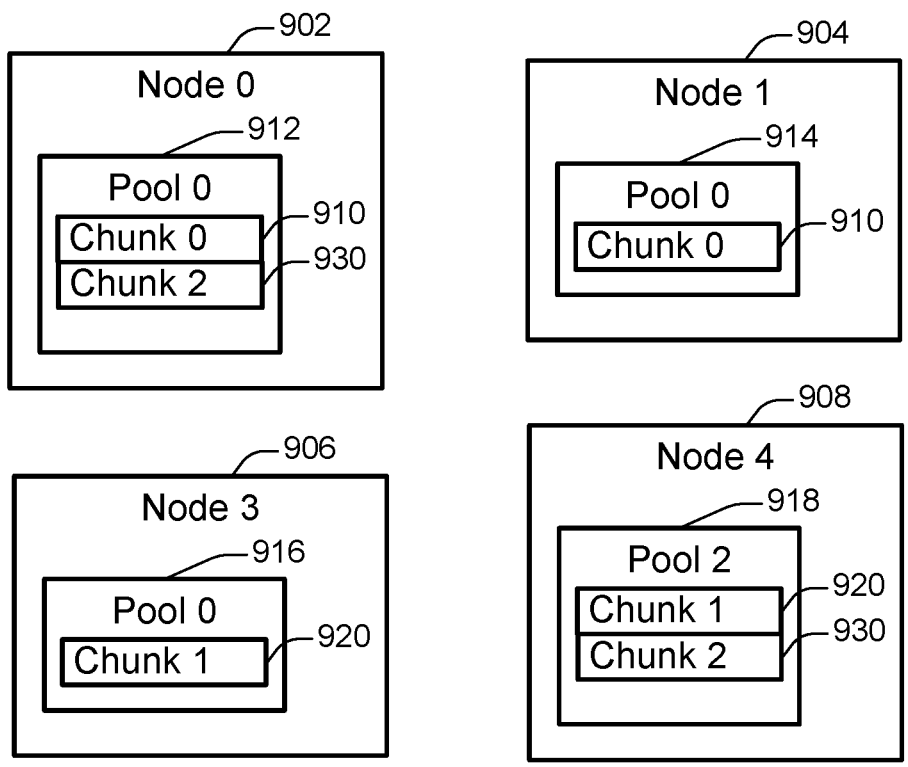

Using the architecture described above, the system can easily increase the size of a storage volume without taking the volume offline. FIGS. 9A-9B illustrate an example of increasing the size of a storage volume, in accordance with one or more embodiments. FIG. 9A illustrates an example storage architecture of volume 900 stored across storage nodes 902, 904, 906, and 908. Volume 900 is stored as two chunks 910 and 920, labeled chunk 0 and chunk 1, respectively. Volume 900 and chunks 910 and 920 have the following specifications:

Volume 900:
    Size: 1 GB
    Replication set number: 2
    Number of chunks: 2
    Chunk_size: 500 MB
    Chunk 0:
        Range: 0-500 MB
        StripeType: none
        StripeSize: 512K
        ReplicationSets: [node 0 (pool 0), node 1 (pool 0)]
    Chunk 1:
        range: 500 MB-1 GB
        StripeType: none
        StripeSize: 512K
        ReplicationSets: [node 3 (pool 0), node 4 (pool 2)]

As shown above, volume 900 is 1 GB in size, and has two replicas in the replication set. That means each chunk also has two replicas. Chunk 910 has replicas stored on pools 912 and 914. In other words, pool 912 stores the exact same data as pool 914. Chunk 920 has replicas stored on pools 916 and 918. Chunk 910 has an offset range of 0-500 MB and chunk 920 has an offset range of 500 MB-1 GB. That means any data with offsets between 0-500 MB is stored on chunk 910, and any data with offsets between 500 MB-1 GB is stored on chunk 920. In the example shown in FIG. 9A, each pool has a pool ID. For example, pools 912, 914, and 916 are all labeled "pool 0." However, chunk replicas can be stored on any of the pools on any of the nodes, such as pool 918, which is labeled "pool 2."

In some embodiments, the system determines that the volume size needs to be increased. In some embodiments, the user makes a request to increase the volume size. In some embodiments, the system determines that the volume size needs to be increased automatically, such as in thin-provisioned systems, where initial allocation of volume size may be less than the user requested during a provisioning request. For example, if the user requested to provision a 5 GB volume, the system can initiate the volume size at 1 GB and then increase it by 1 GB at a time as more and more data is being stored.

In some embodiments, increasing the volume size using the architecture described in FIG. 9A is simply a matter of adding a new chunk. FIG. 9B illustrates how to increase the size of volume 900 by adding a new chunk. For the purposes of this example, we will assume that pools 912 and 918 have more free space than pools 914 and 916. As shown in FIG. 9B, increasing the size of volume 900 involves adding in a new chunk 930, labeled "chunk 2," to the pools that have the most free space, which in this example are pools 912 and 918. In some embodiments, chunk 930 is the same size as the other two chunks and is given an offset range of 1 GB-1.5 GB, resulting in a volume size of 1.5 GB. Thus, after adding new chunk replicas 930 to pools 912 and 918, the specification for volume 900 looks like the following:

Volume 900:
    Size: 1.5 GB
    Replication set number: 2
    Number of chunks: 3
    Chunk_size: 500 MB
    Chunk 0:

Range: 0-500 MB
StripeType: none
StripeSize: 512K
ReplicationSets: [node 0 (pool 0), node 1 (pool 0)]
Chunk 1:
range: 500 MB-1 GB
StripeType: none
StripeSize: 512K
ReplicationSets: [node 3 (pool 0), node 4 (pool 2)]
Chunk 2:
range: 1 GB-1.5 GB
StripeType: none
StripeSize: 512K
ReplicationSets: [node 0 (pool 0), node 4 (pool 2)]

It is worth noting that the example given in FIGS. 9A-9B shows increasing the volume size without moving any data. Many conventional systems do not allow for increasing a volume size without moving data. The techniques and mechanisms provided herein allow for the advantage of increasing volume size without moving data, which reduces utilization of resources and saves processing time.

In some embodiments, the system may sometimes find it advantageous to move data stored on one node or pool to another node or pool. This can often occur if a node or pool is getting full. In such cases, data on the full node or pool needs to be moved. However, conventional systems approach this problem by copying data on the full node or pool in its entirety and then subsequently moving the entire data onto a larger node or pool. However, using the techniques and mechanisms provided, significantly less data is moved, thereby saving on processing time and resources.

Figure 10A:
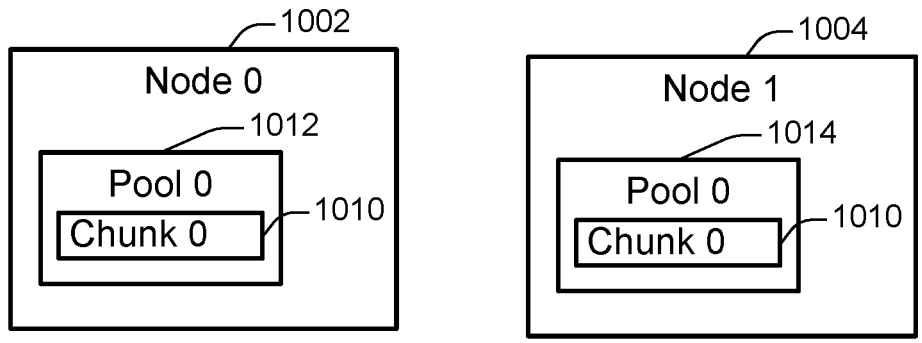
FIGS. 10A-10B illustrate an example of splitting a storage volume, in accordance with one or more embodiments.
Figure 10B:
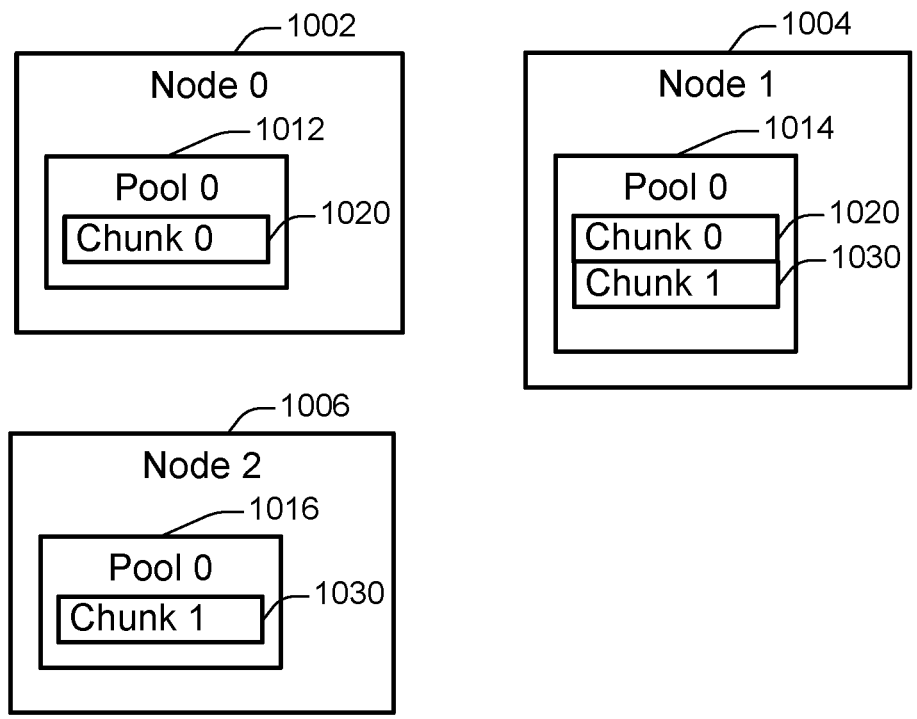

FIGS. 10A-10B illustrate an example of splitting a storage volume, in accordance with one or more embodiments. FIG. 10A depicts volume 1000 as comprising a single chunk 1010. Replica chunks 1010 are stored on pool 1012 of node 1002 and pool 1014 on node 1004. Volume 1010 initially has the following specification:
Volume 1000:
Size: 1 GB
Replication set number: 2
Number of chunks: 1
Chunk size: 1 GB
Chunk 0:
Range: 0-1 GB
StripeType: none
StripeSize: 512K
ReplicationSets: [node 0 (pool 0), node 1 (pool 0)]

If storage on node 1002 becomes full, but node 1004 is not full, then only a part of the volume needs to be moved. More specifically, the system can determine that only a part of the data on node 1002 needs to be moved to another node, instead of moving the entirety of data from node 1002 to another node. In some embodiments, moving partial data involves splitting the original chunk 1010 into multiple smaller new chunks 1020 and 1030, as illustrated in FIG. 10B. In the example shown in FIG. 10B, original chunk 1010 is split into two smaller chunks 1020 and 1030, where each chunk is half the size of original chunk 1010. Since node 1004 is not full, both chunks 1020 and 1030 are stored on the same pool 1014, exactly like original chunk 1010. In other words, although original chunk 1010 is split into new chunks 1020 and 1030 on node 1004, no data is actually moved because it is not needed. However, since node 1002 is full, then new chunk 1020, which is half the size of original chunk 1010, remains on pool 1012 while chunk 1030 is moved to pool 1016 on new node 1006. Since each new chunk is half the size of the original chunk, pool 1012 has freed up half the space that original chunk 1010 used to occupy.

After splitting the volume and moving half to a new node, volume 1010 has the following specification:
Volume 1000:
Size: 1 GB
Replication set number: 2
Number of chunks: 2
Chunk size: 500 MB
Chunk 0:
Range: 0-500 MB
StripeType: none
StripeSize: 512K
ReplicationSets: [node 0 (pool 0), node 1 (pool 0)]
Chunk 1:
range: 500 MB-1 GB
StripeType: none
StripeSize: 512K
ReplicationSets: [node 2 (pool 0), node 1 (pool 0)]

By splitting original chunk 1010 into two smaller chunks, only a portion of the data needs to be moved, thereby reducing processing time and cost. In some embodiments, the chunk size can be changed on the fly, thereby allowing flexibility with regard to how much data is moved. For example, original chunk 1010 can also be split into four new chunks, each with a size of 250 MB. In that case, the system can choose to migrate one, two, or even three chunks, depending on how much space needs to be freed up on node 1002 and how many different new nodes or pools are available for use. It should be noted that the examples given in FIGS. 9A-9B and 10A-10B illustrate a method to adjust a volume without needing to take the volume offline.

In some embodiments, implementing mechanism presented above can include a variety of states and operations. For example, splitting the volume and moving data from one node to another node can include the following states and operations:
State: Original volume with single replication set
Chunk0: 0-1 GB
Set of nodes: (node 0, node 1)
Set of nodes to remove: Empty
Set of nodes to add: Empty
State: New volume State:
Chunk0: 0-500 MB
Set of nodes: (node 0, node 1)
Set of nodes to remove: Empty
Set of nodes to add: Empty
ExpectedOperation
Chunk1: 500 MB-1 GB
Set of nodes: (node 0, node 1)
Set of nodes to remove: (node 0 for 500 mb-1 gb)
Set of nodes to add: (node 2)

In some embodiments, a quiesce operation is first invoked such that any new inflight I/Os are prevented. In some embodiments, all currently inflight operations are completed before the quiesce operation is invoked. Then, in some embodiments, any nodes from the "Set of nodes to remove" are removed from the "Set of nodes" and the volume definition is updated. In some embodiments, the quiesce operation ends after the volume definition is updated. In some embodiments, the data itself can be removed asynchronously after volume definition is updated. So, for the above example, after removing (deleting) 500 MB-1 GB data from Chunk0, the new state is:
State: New volume after remove operation is done:
Chunk0: 0-500 MB Set of nodes: (0, 1)
Set of nodes to remove: Empty
Set of nodes to add: Empty
ExpectedOperation
Chunk1: 500 MB-1 GB
　Set of nodes: (1)
　Set of nodes to remove: Empty
　Set of nodes to add: (2)

In the example above, the next step is to add data for the 500 MB-1 GB range to node 2. In some embodiments, adding the data to node 2 can be implemented using the following method. First, a snapshot is created on node 1 for the volume and transferred to node 2 while I/O operations continue on node 1. Then, a new snapshot is generated on node 1, and blocks which differ in this snapshot from the previous snapshots are transferred to node 2. This process is repeated until the size of the data to be transferred becomes small enough, e.g., under a predetermined size threshold. Then, a resynchronization mechanism is used to bring node 2 and node 1 to the same state (e.g., they become exact copies) and data is served by both the nodes after this mechanism. The resulting state looks like the following:

State: New volume after resynchronization
Chunk0: 0-500 mb
　Set of nodes: (0, 1)
　Set of nodes to remove: Empty
　Set of nodes to add: Empty
ExpectedOperation
Chunk1: 500 mb-1 gb
　Set of nodes: (1, 2)
　Set of nodes to remove: Empty
　Set of nodes to add: Empty In the example above, a new chunk (Chunk1) is added on the same set of nodes (node 0, node 1), while Chunk0 is reduced by half. Next, the 500 MB-1 GB range of Chunk1 is removed from node 0. Then, a new node (node 2) is also added for Chunk1. Thus, the volume is split between two chunks, Chunk0 and Chunk1, with Chunk0 being stored across nodes 0 and 1, while Chunk1 is stored across nodes 1 and 2.

While adjusting unstriped volumes is relatively straight forward using the techniques and mechanisms provided herein, adjusting striped volumes is a bit more complicated. As mentioned above, volume striping increases processing speed and efficiency by allowing I/O operations to occur in parallel. However, adding new nodes in a conventional striped architecture usually requires re-striping the entire volume, which means a lot of data movement between nodes. The techniques and mechanisms provided herein allow for volume adjustment without excess data movement resulting from restriping the entire volume.

Figure 11A:
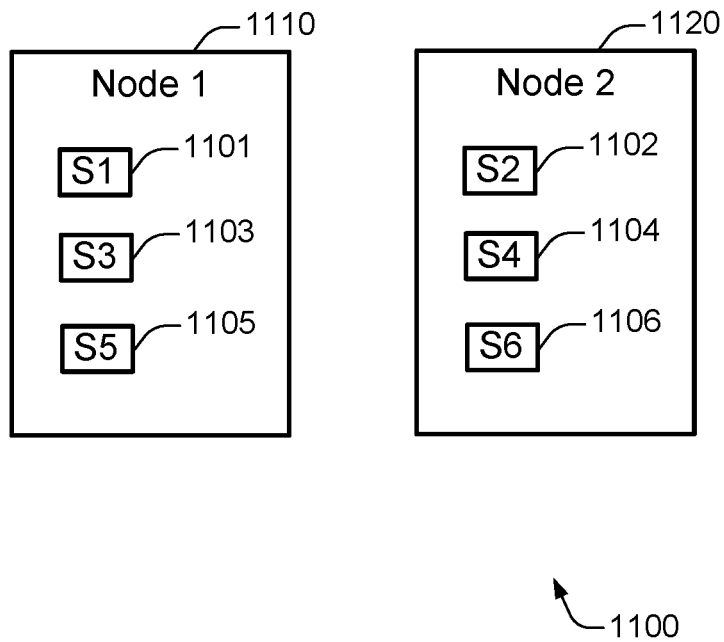
FIGS. 11A-11B illustrate an example of adding a new node in a conventional striped architecture, in accordance with one or more embodiments.
Figure 11B:
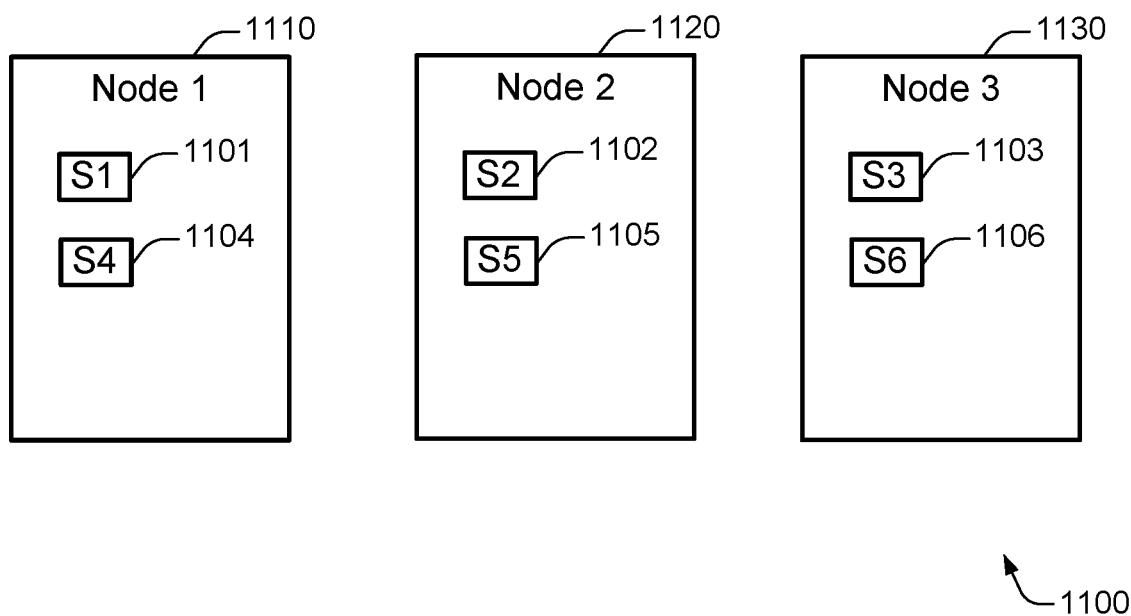

FIGS. 11A-11B illustrate an example of adding a new node in a conventional striped architecture, in accordance with one or more embodiments. In conventional distributed storage systems with striped architecture, volumes are striped across multiple nodes. In FIG. 11A, volume 1100 is alternately striped across two nodes, node 1110 and 1120, labeled "node 1" and "node 2," respectively. Volume 1100 comprises stripes 1101, 1102, 1103, 1104, 1105, and 1106, labeled S1-S6. As shown in FIG. 11A, node 1110 stores stripes 1101, 1103, and 1105. Node 1120 store stripes 1102, 1104, and 1106. In this example of a conventional system, if a new node 1130 (labeled "node 3") were to be added, then volume 1100 would have to be re-striped across the three nodes. That means stripe 1103 has to move from node 1110 to node 1130 and stripe 1106 has to move from node 1120 to node 1130. In addition, stripe 1104 must move from node 1120 to node 1110, and stripe 1105 must move from node 1110 to node 1120. Thus, adding a new node to a conventional striped architecture involves a lot of complicated and unnecessary data migration. The techniques and mechanisms disclosed herein provide for an improved volume storage architecture that allows volume storage adjustment with minimum data movement, even if the volume is striped.

Figure 12A:
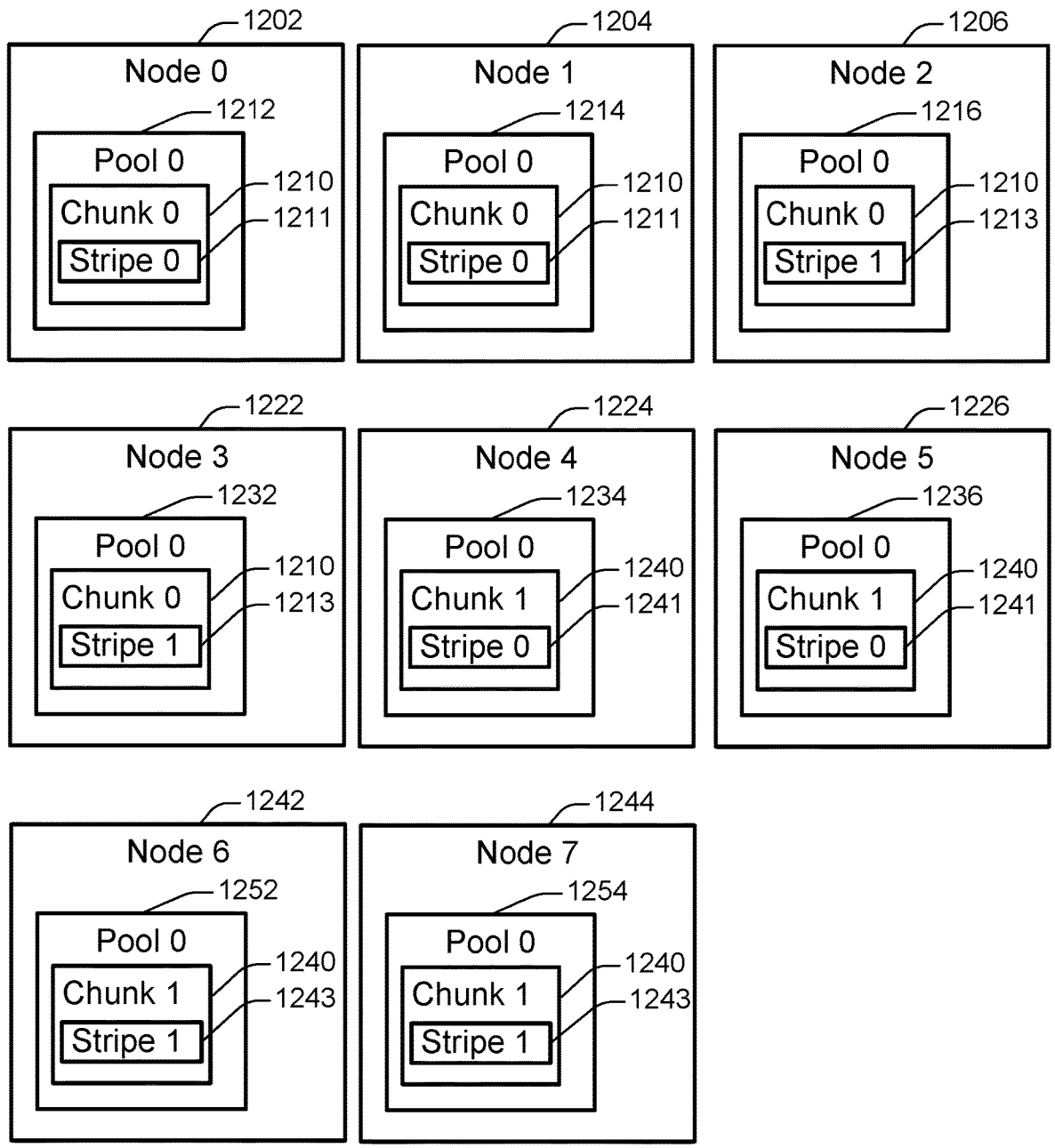
FIGS. 12A-12B illustrate an example of moving part of a storage volume in a striped architecture, in accordance with one or more embodiments.
Figure 12B:
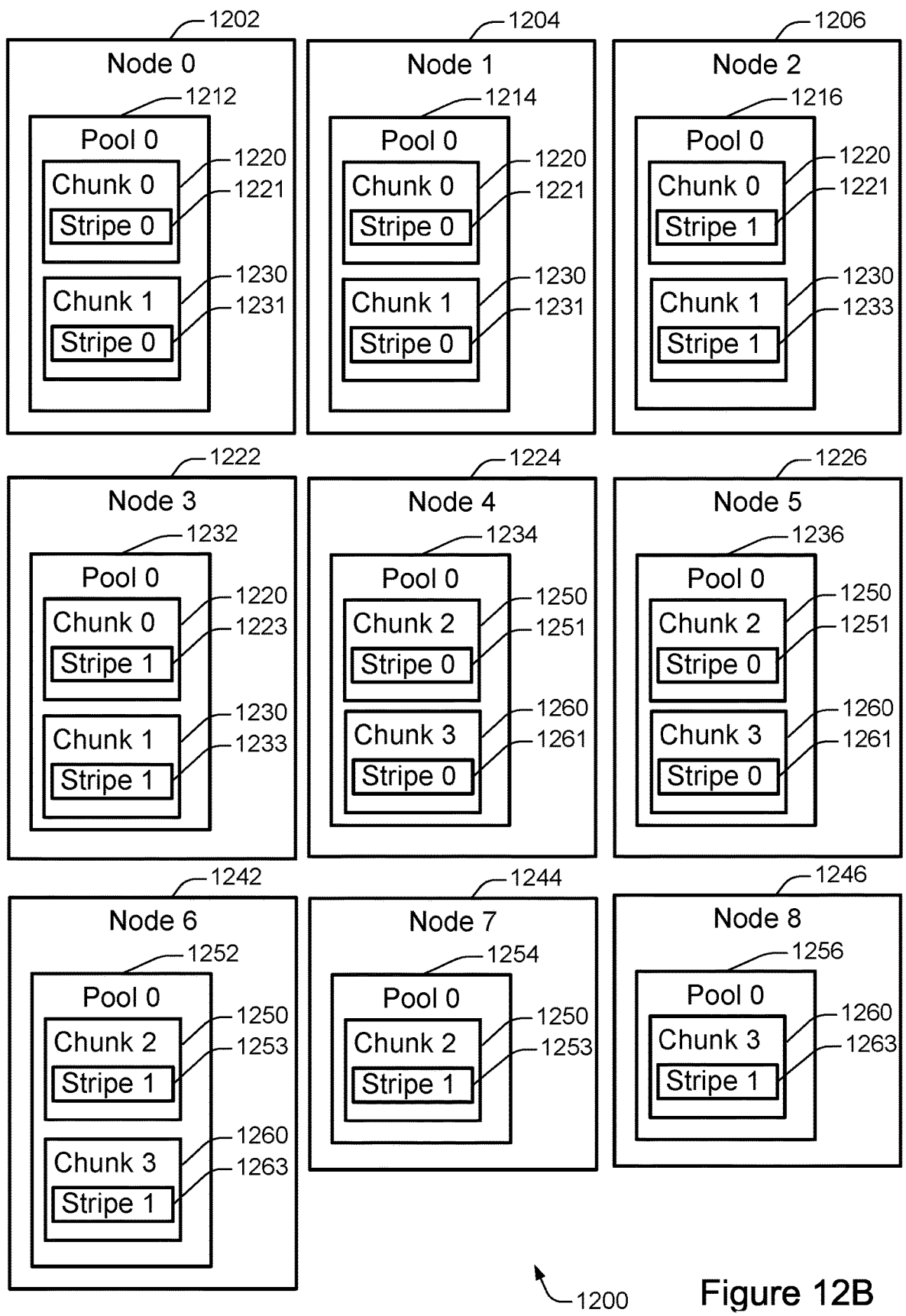

FIGS. 12A-12B illustrate an example of moving part of a storage volume in a striped architecture, in accordance with one or more embodiments. Volume 1200 and its replica are striped across eight nodes 1202, 1204, 1206, 1222, 1224, 1226, 1242, and 1244. Storage pools 1212 and 1214 store copies of the same chunk/stripe replica, storage pools 1216 and 1232 store copies chunk/stripe replica, storage pools 1234 and 1236 store copies of the same chunk/stripe replica, and storage pools 1252 and 1254 store copies of the same chunk/stripe replica. Volume 1200 initially has the following specification:

Volume 1200:
　Size: 1 GB
　Replication set number: 2
　Number of chunks: 2
　Chunk_size: 500 MB
　Chunk 0:
　　Range: 0-500 MB
　　StripeType: alternate
　　StripeSize: 512K
　　ReplicationSets:
　　　Stripe0: [node 0 (pool 0), node 1 (pool 0)]
　　　Stripe1: [node 2 (pool 0), node 3 (pool 0)]
　Chunk 1:
　　range: 500 MB-1 GB
　　StripeType: alternate
　　tripeSize: 512K
　　ReplicationSets:
　　　Stripe0: [node 4 (pool 0), node 5 (pool 0)]
　　　Stripe1: [node 7 (pool 0), node 6 (pool 0)]

In some embodiments, if the system determines that one of the nodes is getting full, for example node 1244 (labeled "node 7"), then the system must move data out of the full node and into a new or free node. In some embodiments, because of the chunking architecture, moving data out of node 1244 simply involves reducing the size of the chunks, thereby increasing the number of chunks, and then moving one stripe of a new chunk out of node 1244 and into new node 1246. In some embodiments, the size of the chunk is reduced by half and the number of chunks is increased by two. Thus, after moving the stripe to a new node, volume 1200 has the following specification:

Volume 1200:
　Size: 1 GB
　Replication set number: 2
　Number of chunks: 4
　Chunk_size: 250 MB
　Chunk 0:
　　Range: 0-250 MB
　　StripeType: alternate
　　StripeSize: 512K
　　ReplicationSets:
　　　Stripe0: [node 0 (pool 0), node 1 (pool 0)]
　　　Stripe1: [node 2 (pool 0), node 3 (pool 0)]
　Chunk 1:
　　Range: 250-500 MB
　　StripeType: alternate
　　StripeSize: 512K
　　ReplicationSets:
　　　Stripe0: [node 0 (pool 0), node 1 (pool 0)]

Stripe1: [node 2 (pool 0), node 3 (pool 0)]
 Chunk 2:
  range: 500 MB-750 MB
  StripeType: alternate
  StripeSize: 512K
  ReplicationSets:
   Stripe0: [node 4 (pool 0), node 5 (pool 0)]
   Stripe1: [node 7 (pool 0), node 6 (pool 0)]
 Chunk 3:
  range: 750 MB-1 GB
  StripeType: alternate
  StripeSize: 512K
  ReplicationSets:
   Stripe0: [node 4 (pool 0), node 5 (pool 0)]
   Stripe1: [node 8 (pool 0), node 6 (pool 0)]

As illustrated above and in FIG. 12B, original chunk 1210 is split into new chunks 1220 and 1230 and original chunk 1240 is split into new chunks 1250 and 1260. In addition, the original stripes are also split into new stripes. Original stripe 1211 is split into new stripes 1221 and 1231, while original stripe 1213 is split into new stripes 1223 and 1233. Similarly, original stripe 1241 is split into new stripes 1251 and 1261, while original stripe 1243 is split into new stripes 1253 and 1263. It is important to note that although original chunks and stripes are split into new chunks and stripes, no data is actually moved from the other nodes. Pools 1212, 1214, 1216, 1232, 1234, 1236, and 1252 retain the same data as before the volume split. Only half of the data on pool 1254 is moved out into new pool 1256. In some embodiments, the chunks and stripes can be split into any number of fragments in order to move different percentages of the original chunks out of full nodes. That way, the "minimum" amount of data to be moved can be adjusted on the fly and adjusted based on design choice.

Figure 13:
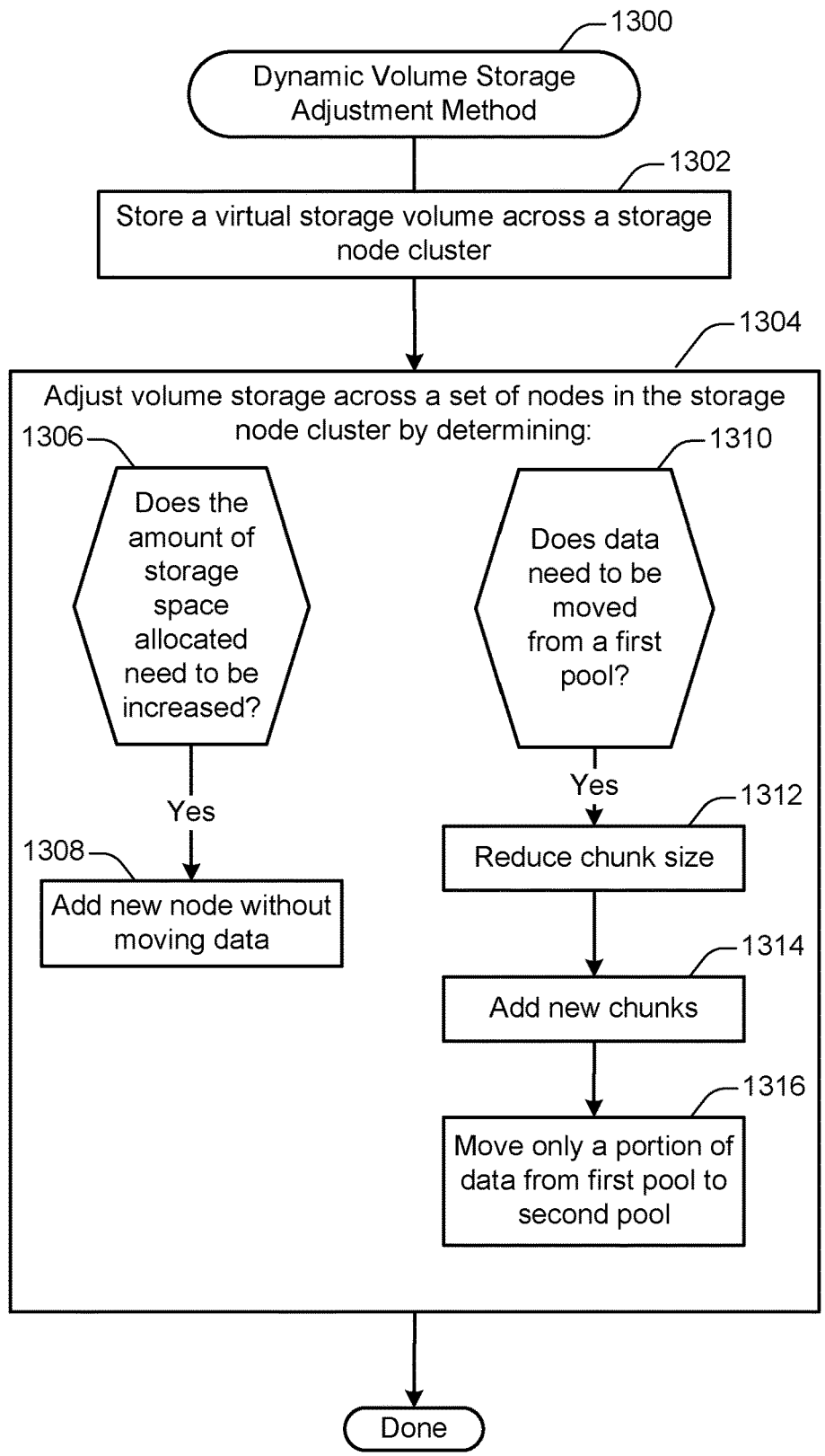
FIG. 13 illustrates an example of a method for dynamic volume storage adjustment, performed in accordance with one or more embodiments.

FIG. 13 illustrates an example of a method for dynamic volume storage adjustment, performed in accordance with one or more embodiments. Method 1300 begins with storing (1302) a virtual storage volume across a storage node cluster. In some embodiments, the storage node cluster includes a plurality of storage nodes. In some embodiments, each storage node includes one or more storage pools for storing data corresponding to the virtual storage volume. In some embodiments, each storage pool corresponds to one or more storage devices having storage space allocated for storing the data. In some embodiments, the virtual storage volume comprises one or more chunks stored on a set of storage nodes in the plurality of storage nodes.

At step 1304, volume storage is adjusted across the set of storage nodes. In some embodiments, adjusting the volume storage includes determining: 1) whether to increase the amount of storage space allocated for the virtual storage volume and 2) whether data needs to be moved from a first pool.

At 1306, it is determined whether the amount of storage space allocated needs to be increased. If yes, then a new chunk is added (1308) to the virtual storage volume without moving data. In some embodiments, the new size of the increased virtual storage volume is a multiple of the size of the new chunk. For example, a volume is originally 500 MB, with only one chunk of size 500 MB. Then if the volume needs to be increased to 1 GB, then a new chunk of size 500 MB is added to the volume, thereby causing the volume to now be 1 GB in size with two chunks of each size 500 MB. 1 GB is a multiple of 500 MB. In another example, if the original volume size of 500 MB, with only one chunk, is to be increased by 250 MB, then a new chunk of 250 MB is added while the original volume comprising only one chunk of 500 MB is split into two chunks of 250 MB each. Thus, after adding the new chunk, the increased volume of size 750 MB now comprises three chunks of 250 MB each. In yet another example, if the original volume size of 500 MB, with only one chunk of size 500 MB, needs to be increased to 1.5 GB, then the system can add two new chunks of 500 MB, thereby resulting in an increased volume of size 1.5 GB comprising three chunks of 500 MB each.

At 1310, it is determined whether data needs to be moved from the first pool. If yes, then storage space in the set of storage nodes is freed up by reducing (1312) the size of each chunk, adding (1314) one or more new chunks with the reduced chunk size, and moving (1316) only a portion of the data from the first pool to a second pool corresponding to the one or more new chunks.

In some embodiments, the virtual storage volume is striped across the one or more storage pools. In some embodiments, chunk sizes can be changed on the fly. In some embodiments, determining whether data needs to be moved includes determining whether data storage for the first pool is over a predetermined threshold for data storage. In some embodiments, determining whether to increase the amount of storage space allocated for the virtual storage volume includes receiving a request to increase the size of the virtual storage volume. In some embodiments, reducing the size of each chunk includes reducing the size of each chunk by the same amount. In some embodiments, any offset can be mapped in O(1), as described below.

The techniques and mechanisms disclosed herein provide many advantages over conventional distributed storage systems. For example, techniques and mechanisms disclosed herein provide flexible and configurable chunk sizes, which can be updated any time without volume downtime. In other words, applications do not need to stop running, unlike conventional systems which may require applications to stop running in order to change volume sizes or move data. In another example, techniques and mechanisms disclosed herein provide that any offset can be mapped in O(1), regardless of the size of volume. This is because the chunks are mapped to offsets. This can be compared to conventional systems that store offsets in a database (e.g., btree). In such conventional systems, mapping offsets may take O(log (n)), where n is the volume size. In some embodiments, random chunks of offsets can be stored such that offsets can be retrieved anytime from the database.

In yet another example, techniques and mechanisms disclosed herein provide for adding new nodes to extend volumes with zero data movement. This can be compared to traditional striping in conventional systems, which require lots of data movement. In yet another example, techniques and mechanisms disclosed herein provide for configurable and flexible data movement when replacing any node. The amount of data that needs to be moved is then simply limited by the size of the new chunk, without requiring volume down time. In yet another example, techniques and mechanisms disclosed herein eliminate the need for extensive database look ups which can cause latency issues.

In yet another example, techniques and mechanisms disclosed herein allow for distribution of data based on access patterns, e.g., hot or cold access of nodes/pools. In some embodiments, "cold" chunks, or chunks that have not been accessed for a predetermined period of time (e.g., 1 week) may be relocated to a different tier. Using conventional striped systems, moving "cold" chunks of data is very inefficient. However, moving these chunks using the techniques and mechanisms described herein is relatively straight forward. In addition, the techniques and mechanisms facilitate "dynamic chunking," which allows translating "hot" chunks into actual volume chunks at runtime.

Figure 14:
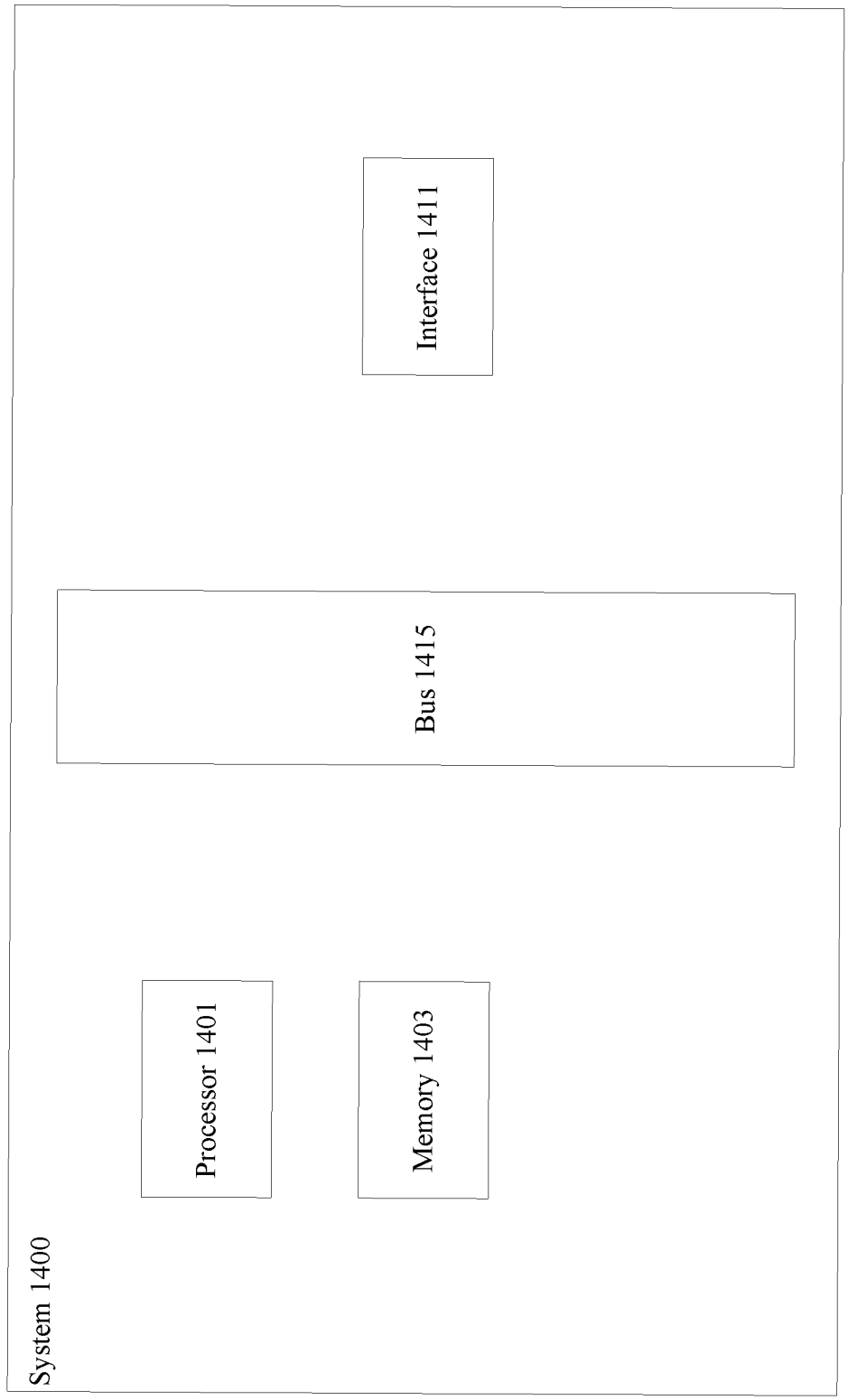
FIG. 14 illustrates an example of a server, configured in accordance with one or more embodiments.

FIG. 14 illustrates one example of a server. According to particular embodiments, a system 1400 suitable for implementing particular embodiments of the present disclosure includes a processor 1401, a memory 1403, an interface 1411, and a bus 1415 (e.g., a PCI bus or other interconnection fabric) and operates as a container node. When acting under the control of appropriate software or firmware, the processor 1401 is responsible for implementing applications such as an operating system kernel, a containerized storage driver, and one or more applications. Various specially configured devices can also be used in place of a processor 1401 or in addition to processor 1401. The interface 1411 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1400 is a server configured to run a container engine and/or a storage container node as shown herein. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the disclosure has been described with reference to specific embodiments. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure.

What is claimed is:

1. A method comprising:
   storing a virtual storage volume across a plurality of storage nodes, wherein the virtual storage volume comprises one or more chunks stored on a set of storage nodes in the plurality of storage nodes; and
   adjusting the one or more chunks that make up the virtual storage volume, without taking the virtual storage volume offline, wherein the adjusting comprises reducing a size of each of the one or more chunks to a reduced chunk size and adding one or more new chunks with the reduced chunk size.

2. The method of claim 1, wherein the adjusting further comprises:
   determining to move data of the virtual storage volume; and
   moving only a portion of the data.

3. The method of claim 2, wherein the moving only the portion of the data comprises moving only a new chunk of the one or more new chunks.

4. The method of claim 2, wherein the moving only the portion of the data comprises moving only a chunk of the one or more chunks that were reduced to the reduced chunk size.

5. The method of claim 2, wherein the moving only the portion of the data comprises moving a chunk with the reduced chunk size from a first storage node to a second storage node in the plurality of storage nodes.

6. The method of claim 1, further comprising:
   determining to increase the amount of storage space allocated for the virtual storage volume; and
   adding an additional new chunk with the reduced chunk size to the virtual storage volume without moving data across storage nodes.

7. The method of claim 6, wherein a new size of the virtual storage volume is a multiple of the reduced chunk size.

8. The method of claim 1, wherein the virtual storage volume is striped across the set of storage nodes.

9. A system, comprising:
   a memory storing instructions; and
   a processor coupled to the memory and configured to execute the instructions to:
      store a virtual storage volume across a plurality of storage nodes, wherein the virtual storage volume comprises one or more chunks stored on a set of storage nodes in the plurality of storage nodes; and
      adjust the one or more chunks that make up the virtual storage volume, without taking the virtual storage volume offline, wherein the adjusting comprises reducing a size of each of the one or more chunks to a reduced chunk size and adding one or more new chunks with the reduced chunk size.

10. The system of claim 9, wherein the adjusting further comprises:
    determining to move data of the virtual storage volume; and
    moving only a portion of the data.

11. The system of claim 10, wherein the moving only the portion of the data comprises moving a new chunk of the one or more new chunks.

12. The system of claim 10, wherein the moving only the portion of the data comprises moving a chunk of the one or more chunks that were reduced to the reduced chunk size.

13. The system of claim 10, wherein the moving only the portion of the data comprises moving a chunk with the reduced chunk size from a first storage node to a second storage node in the plurality of storage nodes.

14. A computer program product embodied in a non-transitory tangible computer readable storage medium and comprising computer instructions for:
    storing a virtual storage volume across a plurality of storage nodes, wherein the virtual storage volume comprises one or more chunks stored on a set of storage nodes in the plurality of storage nodes; and
    adjusting the one or more chunks that make up the virtual storage volume, without taking the virtual storage volume offline, wherein the adjusting comprises reducing a size of each of the one or more chunks to a reduced chunk size and adding one or more new chunks with the reduced chunk size.

15. The computer program product of claim 14, further comprising instructions for:
    determining to move data of the virtual storage volume;

performing the adjusting in response to the determining to move data of the virtual storage volume; and moving only a portion of the data.

16. The computer program product of claim 15, wherein the moving only the portion of the data comprises moving a new chunk of the one or more new chunks.

17. The computer program product of claim 15, wherein the moving only the portion of the data comprises moving a chunk of the one or more chunks that were reduced to the reduced chunk size.

18. The computer program product of claim 14, wherein the adjusting is performed in response to a determination to move data of the virtual storage volume.

19. The computer program product of claim 14, further comprising instructions for:

determining to increase the amount of storage space allocated for the virtual storage volume; and adding an additional new chunk with the reduced chunk size to the virtual storage volume.

20. The computer program product of claim 14, wherein the virtual storage volume is striped across the set of storage nodes.

\* \* \* \* \*